United States Patent [19]
Nelson

[11] Patent Number: 5,322,181
[45] Date of Patent: * Jun. 21, 1994

[54] PROTECTIVE PACKAGING APPARATA AND METHOD OF MANUFACTURE

[75] Inventor: Thomas E. Nelson, Crestwood, Ky.

[73] Assignee: Soltech, Inc., Shelbyville, Ky.

[*] Notice: The portion of the term of this patent subsequent to Nov. 27, 2007 has been disclaimed.

[21] Appl. No.: 77,518

[22] Filed: Jun. 15, 1993

Related U.S. Application Data

[63] Continuation of Ser. No. 671,366, Mar. 19, 1991, Pat. No. 5,226,557, which is a continuation-in-part of Ser. No. 584,251, Sep. 18, 1990, Pat. No. 5,172,731, which is a continuation-in-part of Ser. No. 412,923, Sep. 26, 1989, Pat. No. 4,972,759, which is a continuation-in-part of Ser. No. 309,658, Feb. 13, 1989, Pat. No. 4,878,459.

[51] Int. Cl.$^5$ .............................................. E04B 1/74
[52] U.S. Cl. ................................... 220/461; 220/459; 220/470; 206/523
[58] Field of Search ............... 220/461, 460, 417, 470, 220/416; 206/523, 586; 428/71

[56] References Cited

U.S. PATENT DOCUMENTS

| | | | |
|---|---|---|---|
| 3,096,879 | 7/1963 | Schumacher | 206/523 |
| 3,344,973 | 10/1967 | Studen | 206/523 |
| 4,497,859 | 2/1985 | Baumann | 206/523 |
| 4,878,459 | 11/1989 | Nelson | |
| 4,953,705 | 9/1990 | Evamy | 206/523 |
| 4,972,759 | 11/1990 | Nelson | |
| 5,226,557 | 7/1993 | Nelson | 220/461 |

FOREIGN PATENT DOCUMENTS

| | | |
|---|---|---|
| 2647142B1 | 3/1978 | Fed. Rep. of Germany. |
| 8810158 | 9/1988 | Fed. Rep. of Germany. |
| 533932 | 2/1941 | United Kingdom. |

*Primary Examiner*—Joseph Man-Fu Moy
*Attorney, Agent, or Firm*—Woodard, Emhardt, Naughton, Moriarty & McNett

[57] ABSTRACT

A protective wrap for use in packaging and shipping includes a plurality of flexible material strips whose length and width may be varied as well as the selected material and a plurality of relatively rigid material strips whose length would typically be the same length as the flexible material strips but whose width will vary depending upon the application. A suitable material for the relatively rigid material strips is corrugated paper or expanded polystyrene foam. The flexible material strips and the relatively rigid material strips are arranged side by side in alternating sequence and when a backing layer is not used, the strips are joined to each other by adhesive. When a backing layer is used the strips may either be joined together by adhesive or joined by adhesive directly to the backing layer. While both materials may provide suitable protection for the article being packaged and shipped, the flexible material strips allow the wrap to be shaped and conformed to the product while the rigid material strips provide strength and rigidity also for protection as well as for strength in carton stacking.

12 Claims, 20 Drawing Sheets

PROTECTIVE PACKAGING APPARATA AND METHOD OF MANUFACTURE

REFERENCE TO RELATED APPLICATIONS

This application is a continuation of application No. 07/671,366, filed Mar. 19, 1991, U.S. Pat. No. 5,226,557 which is a continuation-in-part patent application of my prior and copending application Ser. No. 584,251 filed Sep. 18, 1990 now U.S. Pat. No. 5,172,731 which is a continuation-in-part of patent application of my prior application Ser. No. 412,923, filed Sep. 26, 1989, now issued U.S. Pat. No. 4,972,759, which is a continuation-in-part patent (application) of prior copending application Ser. No. 309,658, filed Feb. 13, 1989, now issued U.S. Pat. No. 4,878,459.

BACKGROUND OF THE INVENTION

The present invention relates in general to insulation concepts and arrangements for surrounding or enclosing an interior member, such as insulation around a pipe or insulation around a fragile or delicate instrument. More particularly the present invention relates to reusable, versatile protective packaging wrap of alternating, rigid and flexible sections for use in enclosing, surrounding and protecting products, devices and components during shipment. In certain instances the protective packaging may be used after shipment for protection during use or for thermal insulation, such as around a water heater.

There are a variety of methods and devices which are commonly used for protecting products and components from physical damage during handling, shipping, transportation, etc. Whether shipped by water, air, road or rail, these products and components may be subjected to physical impact, dropping or collision. The problems and considerations of protection do not change regardless of the origin or destination. Dropping and rough handling can occur at any time.

With the increased interest and activity in the area of mail order consumer shopping, overnight air deliveries and other services of this type, there is a trend toward smaller items being shipped in their own container with their own special packaging requirements. Very often an individual may ship items via the U.S. Postal Service or similar courier or express mail service that requires special cushioning and protection in order to withstand the rigors of handling during sorting, routing and transportation.

There are several commonly used methods of packaging that have proven successful when correctly selected and applied for the particular product or component. One of the most common methods of protecting small to medium size consumer products is to make a molded expanded polystyrene (EPS) barrier that encloses all or part of the item to be protected. This combination is then usually placed in a corrugated box or container which is sealed and then labeled for shipment. One significant cost aspect associated with such molded expanded polystyrene packaging is the cost of tooling. In order to precisely shape the molded EPS for the particular product the tooling must be specifically designed and while very expensive, it also has a somewhat limited production life. This fact creates several considerations before one should select this protecting packaging option. Molded EPS is best suited for high volume mass production items because of the tooling expense. However, a different tool and molded packaging part design is needed for each and every different item to be shipped if a close conforming fit between the part and the EPS barrier is desired. Once an item has been shipped to its final destination, the molded EPS protective packaging simply becomes waste for a landfill or trash dump. The machinery necessary for molding EPS is very expensive and thus is a major factor in the cost and selling price of such EPS protective packaging.

Another common method of protective packaging is the use of corrugated paper products. These types of protective items are most often in sheet form for some cushioning effect or in the form of a corner post for added structural strength and integrity to the overall package. This structural strength enables the cartons to be stacked one on top of the other even when relatively heavy items are packaged inside without crushing the lower cartons. Appliances and home entertainment devices are typically packaged in this way with a corrugated support pad surrounded by four corrugated corner posts which are then all enclosed by an exterior and surrounding corrugated box.

Resilient flexible foams are also used for protective packaging, either by themselves or in combination with corrugated paper, molded rigid foam, fabricated rigid foam, corrugated boxes, corner post, etc. As might be appreciated, each of these existing methods of protective packaging have some attributes as well as some deficiencies. To more clearly emphasize these strengths and weaknesses it is important to outline the important and desirable characteristics of any protective packaging material or system.

One consideration is to provide adequate cushioning or shock absorption for the product or component being shipped. The normal handling of packaged products during loading, shipment and unloading exposes a package to a variety of impact forces and collisions that can cause damage to the product inside the carton. If a product is surrounded partially or entirely by a material such as flexible foam it will be cushioned to a degree from these external forces which may be applied at almost any point on the package. When these external forces strike the package the resilient material surrounding the product yields and hopefully prevents this external force from being transmitted to the product inside.

If a package is dropped the external box would see damage from the force of striking the ground while hopefully the foam would not only prevent transmission of some or all of this force but would also allow the product inside to have some capability of movement or shifting similar to shock absorber action. The inertia generated by the falling motion due to gravity compresses the foam allowing the product inside the carton to stop more gradually than the box thus preventing some or all of the potential damage.

Some packaging techniques allow for a spacing or set back of the product from the surrounding carton. When the product is suspended in the center of a box by several inches of space buffer around it, it is possible to puncture the box or deform some portion of the box and yet not reach the product inside.

Some packaging techniques provide additional stiffness such as corrugated corner posts or a combination of wood and corrugated paper laminated into corner posts in order to allow these packages to be stacked one upon another and yet support the weight of the carton and the product inside. Other protective packaging techniques include thermal insulation so that a product may be shipped at or near a desired temperature and remain in an acceptable temperature range during shipment regardless of normal outside temperature variations. Thermal insulation as part of the protective packaging may be desired when shipping medical or chemical supplies which need to be maintained within a relatively narrow temperature band or when shipping produce or food products which may need to be kept at a lower temperature to maintain freshness and prevent the produce from spoiling.

In almost every instance outlined above an external container, usually of corrugated paper or paperboard is used in combination with one or more of the identified protective packaging techniques. Although there are many variations or permutations for protective packaging, most products are shipped in a corrugated container with corrugated corner posts and corrugated sheets inside often with molded foam or cushioning material. In some instances loose filler materials or "peanuts" may be used. Most protective packaging combinations have certain desirable properties as well as certain weaknesses or deficiencies. By first considering all the possible attributes or properties each specific combination can then be evaluated or rated as to whether it is excellent, good, average or poor as to each property or attribute. By understanding the pluses and minuses associated with each type of protective packaging an appropriate selection can be made depending on what the shipper wants to achieve and the nature of the product being shipped.

Typically properties or attributes of a protective packaging system which may be important to a shipper include the following:

| | |
|---|---|
| Stiffening Strength | Shock Absorption |
| Contoured Shape Preciseness | Setback Suspension |
| Thermal Insulation | Puncture Resistance |
| Tooling Costs | Production Costs |
| Recyclable | Biodegradable |
| Reusable | |

As an indication of typical protective packaging options and how well suited they are in providing each property or attribute, the following sampling is offered. For stiffening and strength corrugated corner posts are excellent while flexible foam or loose packing is relatively poor. For shock absorption flexible foam is excellent while corrugated pads and corner posts are relatively poor. For contoured shape preciseness molded EPS is excellent while corrugated pads and corner posts are only average to poor. For setback suspension molded EPS is excellent. For thermal insulation materials such as fiberglass and molded foam are excellent while corrugated pads are poor. As to puncture resistance, setback suspension likely provides the best resistance simply by buffering the product from the inside surfaces of the container by an airspace. However, sufficient layers of corrugated pads and posts would provide some puncture resistance. As to tooling costs, corrugated pads and corner posts as well as loose packing material are excellent in that their cost is negligible. As to molded EPS, its cost is extremely high and thus would be rated as poor with regard to tooling costs. The same would be true as to production costs with loose packing and corrugated paper having virtually no production cost or at least a negligible production cost while molded EPS would be comparatively extremely high. As to the properties of being recyclable, biodegradable or reusable molded EPS is relatively poor as to each due to its specific nature which is tied to the shape of the specific product shipped.

Corrugated lamination have stiffness as their most important attribute. Corner posts can be made by laminating sheets of corrugated paper or paperboard together and then slitting them in order to allow a 90° fold along the length. Thus when these corrugated corner posts are placed vertically in a box, typically in the corner, they add excellent stacking strength, stiffness to the carton and they provide an adequate buffer space or setback between the carton wall and the product. However, corrugated paper or paperboard is not flexible or resilient and therefore not very good for cushioning. While it would be possible to put an inner layer of cushioning material between the product and the corner post for shock absorption, this would require the use of a larger carton in order to accommodate the extra thickness of protective packaging material. This design would also affect the stacking strength because the corner post would be able to, move within the carton as the foam cushion deflects. Without a compressible cushioning layer the corner post cannot move because they are contained in contact with the carton on one side and with the product on the other side.

Molded EPS packaging components or parts have excellent conformability to the intricacies of the shape or contour of the product to be protected. The major drawback to molded EPS is the cost of tooling and the high cost of production. A user of this protective packaging concept must have very high volume production and preferably standard shaped parts in order to justify the tooling expense. Further, because these items are molded to precisely fit a given part they do not have any generic recyclable or reusable capability. Once they are removed from around the shipped product they are typically discarded. This adds to waste and landfill problems because this material is not biodegradable. Molded EPS will provide some stiffening properties but it does not perform as well in this regard as do corrugated paper or paperboard laminates. Molded EPS also does not cushion as well as flexible foam. Noting that flexible foam has cushioning as its most important attribute and does not provide much else in the way of protective packaging attributes.

By making a packaging jacket or wrap by combining the stiffness of corrugated paperboard or rigid foam with the cushioning and deflection characteristics of flexible foam, the resultant wrap can offer unique protective packaging advantages. As described in applicant's prior U.S. patents, U.S. Pat. Nos. 4,878,459 and 4,972,759, it is possible to laminate alternating strips of different materials in order to provide a protective wrap with unique advantages. Alternating rigid and flexible material provides a protective packaging product that can bend and form itself around a product to be protected even when that product has a somewhat intricate or unique contour. At the same time this protective packaging will provide adequate stiffness and rigidity for stacking strength. These two U.S. Pat. Nos. 4,878,459 and 4,972,759, both issued to Nelson are hereby expressly incorporated by reference for the entirety of their respective disclosures.

SUMMARY OF THE INVENTION

A protective wrap for use in packaging and shipping according to one embodiment of the present invention comprises a plurality of flexible material strips and a plurality of relatively rigid material strips wherein the flexible material strips and the relatively rigid material strips are arranged side by side in alternating sequence and joined in position in order to create a blanket of protective material.

One object of the present invention is to provide an improved protective packaging wrap for use in packaging and shipping of articles needing protection.

Related objects and advantages of the present invention will be apparent from the following description.

DESCRIPTION OF THE PREFERRED EMBODIMENT

Figure 1:
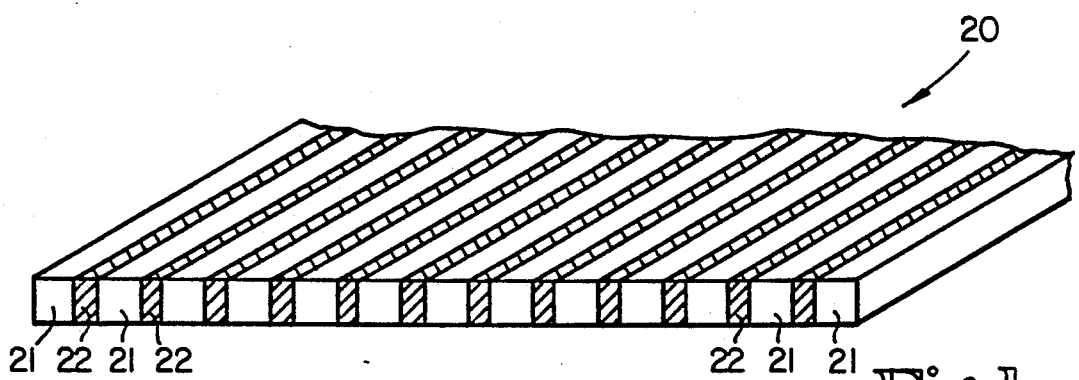
FIG. 1 is a partial perspective view of a protective packaging wrap according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a sheet 20 of protective packaging insulation consisting of alternating strips 21 of flexible packaging material with strips 22 of rigid packaging material. At the outset it should be understood that the use of terms such as "flexible" and "rigid" are somewhat relative rather than absolute. It is intended that "flexible" will refer to packaging material which is compressible and resilient enabling it to shape itself over and around intricate contours as would be necessary to provide precisely fitting protective packaging. The concept of "rigid" material as used herein is intended to cover insulation and packaging material which under normal weight and stacking and under normal packaging and handling conditions will not yield, compress or fracture. However, the term "rigid" is not intended to mean materials having the strength and rigidity of steel for example. Under the extremes of abusive handing, dropping, collision, etc. the "rigid" material may yield or deform slightly. This ability to yield or deform slightly under extreme loads, thereby serving as a shock absorber while maintaining rigidity under normal conditions, provides a unique blend of material properties for the protective packaging apparata of the present invention.

By alternating flexible strips 21 with rigid strips 22 and adhesively joining adjacent strips together, sheet 20 becomes a single member and is able to be wrapped around almost any complex or intricate outer peripheral shape for the product being shipped. While the flexible strips 21 bend and compress to conform the shape of sheet 20 to the product, rigid strips 22 provide strength and rigidity to the final package enabling stacking of the cartons without compression damage.

This combination of flexible and rigid strips provide stiffening, shock absorption, precise conformity, setback spacing suspension and thermal insulation with appropriate material selection. This is all achieved with negligible tooling costs and very low production costs. The sheet can be reused thus alleviating some of the landfill concerns.

Suitable materials for the flexible material strips 21 when the primary function is protective packaging include:

fiberglass batting
layered paper
flexible urethane foam
resonated cotton batting (bonded fiber)
cross linked polyethylene foam
elastomeric foam
bonded cellulose fiber batting Suitable material for rigid material strips 22 when the primary function is protective packaging include:

| | |
|---|---|
| corrugated paper | wood |
| extruded polystyrene foam | chip board |
| expanded polystyrene foam | paper board |
| rigid urethane foam | plastic sheet |
| thin gauge metal | corrugated plastic |
| polyethylene foam | rigid polyisocyanurate foam |
| phenolic foam | |

When there is a desire to provide greater thermal insulation for the protective packaging flexible urethane foam, fiberglass, elastomeric foam, and/or cross linked polyethylene foam can be used for the flexible strips and EPS foam, extruded polystyrene foam, phenolic foam, rigid urethane foam, and/or rigid polyisocyanurate can be used for the rigid strips.

A greater thermal insulating capability may be desirable when shipping frozen foods which need both packaging protection to shield them from impact and collision forces but at the same time packaging which helps to maintain their frozen status. Some medicines and chemicals are temperature sensitive and need to be kept cool during shipment or possibly warmer during the cold months or when entering cold climates.

If one desires for the flexible and rigid strips of material to be biodegradable a material selection can be made on that basis where materials such as cotton and wood fibers would be suitable for the flexible strips. Corrugated paper or paper board would be suitable for the relatively rigid strips.

Figure 2:
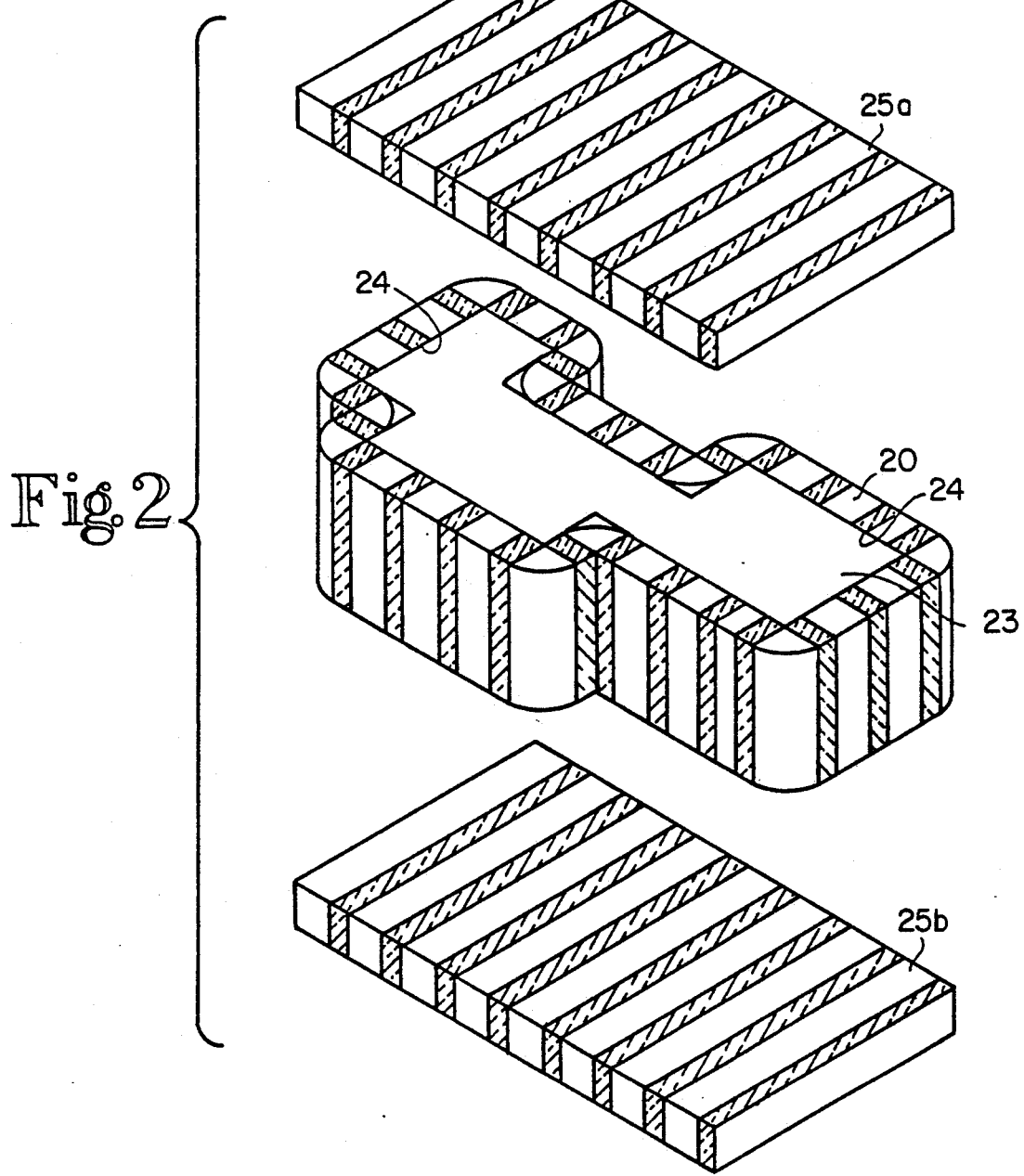
FIG. 2 is a perspective view of the FIG. 1 protective packaging wrap as configured around a product to be protected according to the present invention.
Figure 2A:
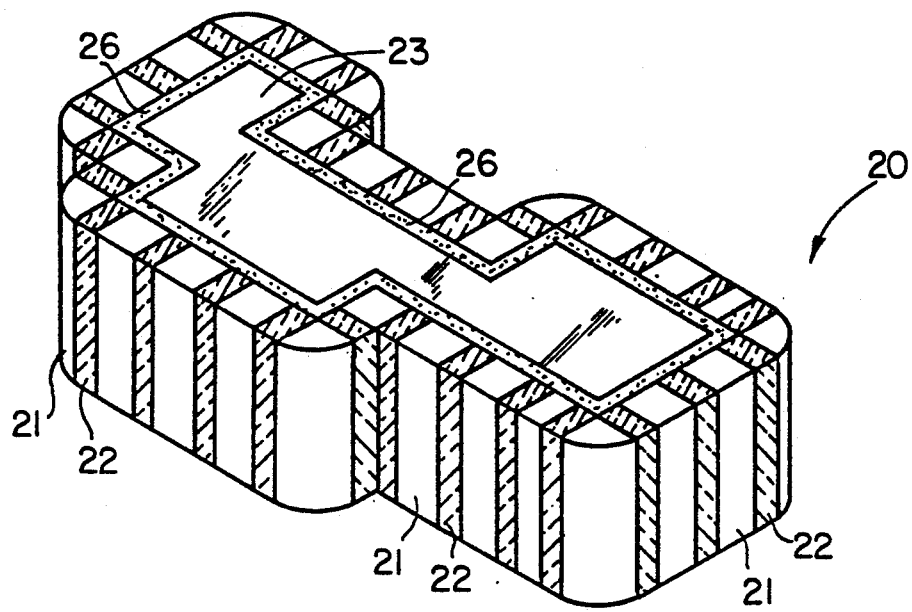
FIG. 2A is a perspective view of the FIG. 2 protective packaging wrap additionally including a soft foam layer for additional product protection according to the present invention.

FIG. 2 illustrates how sheet 20 is wrapped around product 23 whose outer edge 24 has an intricate shape. As needed, additional sheets 25a and 25b of alternating strips 21 and 22 may be used like sheet 20 to protect the top and bottom of product 23. Referring to FIG. 2A a variation to the sheet 20 configuration of FIGS. 1 and 2 is illustrated. By overlaying a layer 26 of soft urethane foam on the surface of sheet 20 which faces the product or component to be protected, extra cushioning is provided around product 23. This alternative is desirable when the product or component is especially fragile or where there are protruding portions that need an added thickness of insulation material. The thickness of the foam layer 26 may vary depending upon the application but in order to make the packaging sheet somewhat generic and reusable, a mid range or nominal thickness is used. A similar layer of soft urethane material may also be added to sheets 25a and 25b if the top and/or the bottom of the product need added protection.

This added layer of soft urethane foam, or any other suitable material, can be used with most of the embodiments to be described herein including those embodiments of FIGS. 4, 5, 7, 8 and 9, for example. This soft foam layer can be used in place of the skin or backing of FIG. 15, for example, and its use is compatible with the fabrication concept and steps of FIGS. 10, 11, 12, 13 and 14, for example. The soft foam layer can be added to the constructions illustrated in FIG. 21 as well as those of FIGS. 26, 27 and 28, for example.

Figure 3:
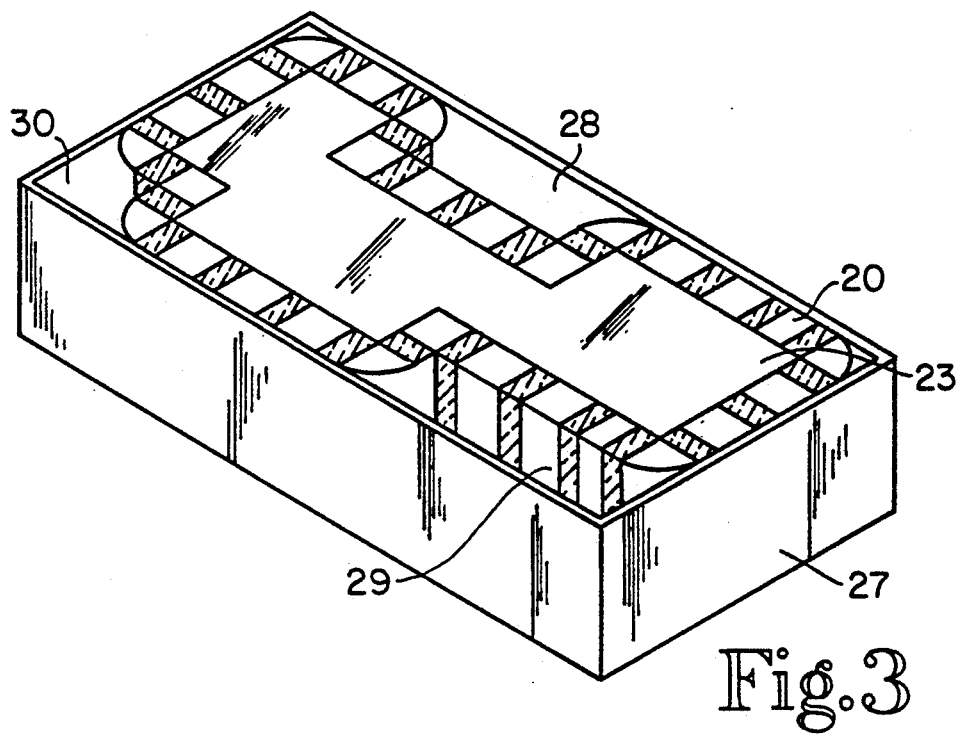
FIG. 3 is a perspective view of the FIG. 1 protective packaging wrap as disposed around a product and placed within a corrugated container according to the present invention.

FIG. 3 illustrates the wrapped product 23 (without layer 26) as placed inside a corrugated carton 27 for final packaging and shipment. Voids 28, 29 and 30 which are the result of placing an intricate shape inside a rectangular carton 27 can be filled with loose pack insulation or portions of sheets of alternating strips such as sheets 20, 25a, or 25b if necessary or desirable to support the sides of the carton or to prevent any shifting of the wrapped product 23.

As should be understood, this flexible/rigid wrap (sheet 20) can be used for a wide variety of shapes by covering some or all of the sides, as well as the top and bottom. Although sheets 25a and 25b are shown as flat sheets, if the top or bottom of the product is contoured with raised or recessed portions then these sheets will readily conform to match these top and bottom product contours. These flexible/rigid sheets 20, 25a and 26b can be removed upon unpacking the product and then reused for a different product with a different outer surface contour.

While a primary reuse opportunity will be for shipments between manufacturers wherein the original recipient becomes the subsequent shipper, reuse is not limited to this situation. Even in those situations where the product is a mail order product and the recipient is a household occupant, the flexible/rigid sheets can be reused. Reuse is an option if the product or another product has to be returned to the shipper. Reuse is also an option for any shipping which the recipient may need to do of other products or devices to other individuals.

Figure 4:
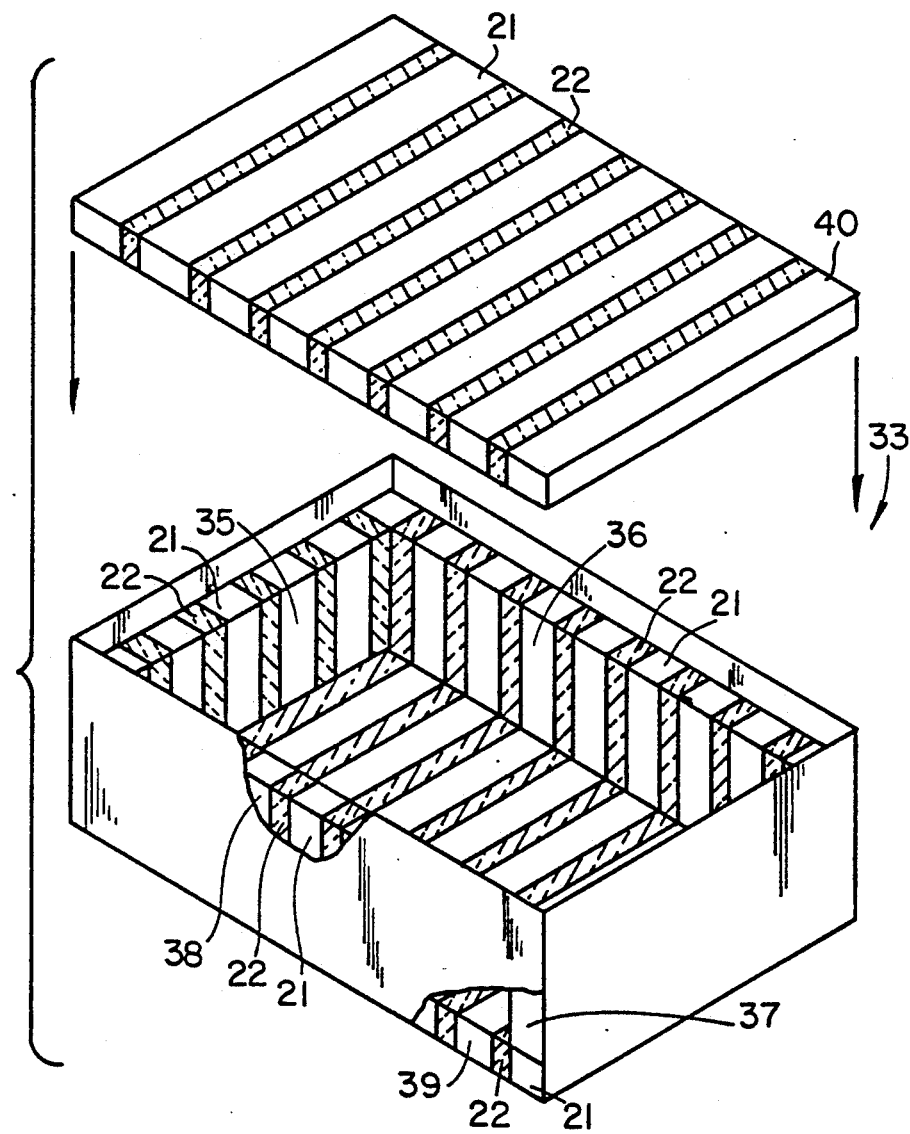
FIG. 4 is a perspective view of the FIG. 1 protective packaging wrap as configured within a generally rectangular container according to the present invention.

Referring to FIG. 4 an alternative configuration for protective packaging according to the present invention is illustrated. Protective packaging 33 is configured for more conventional shapes such as rectangular solids. As illustrated in FIG. 4, packaging 33 is fitted against the bottom surface and the four side walls of carton 34. Packaging 33 includes four side panels 35, 36, 37 and 38 which may be single panels or integral panels similar to the continuous and surrounding configuration of sheet 20. Packaging 33 also includes a bottom panel 39 and top panel 40. Each of these six panels is configured similar to sheets 20, 25 or 26 with an alternating sequence of flexible material strips 21 and rigid material strips 22. The material options include all of those previously mentioned for strips 21 and 22 as part of the description for sheets 20, 25, and 26.

Figure 4A:
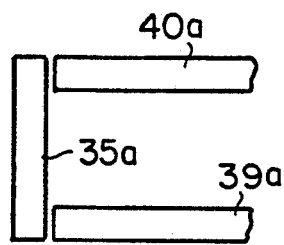
FIGS. 4A, 4B and 4C are diagrammatic illustrations of the FIG. 4 package with different configurations for the floor and top portions of the protective packaging wrap relative to the side portions.
Figure 4B:
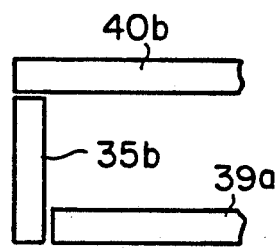
Figure 4C:
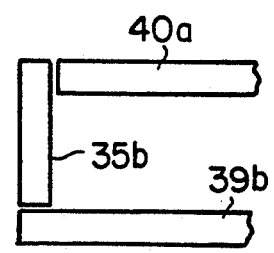

The height of the four side panels depends on the desired positioning of the top and bottom panels. In the illustrated embodiment of FIG. 4, the top 40 and bottom 39 panels are sized to fit completely over and under the side panels respectively. Consequently, the height of the four side panels is less than the height of carton 34 by the combined thickness of the top and bottom panels. Alternatively, as illustrated in FIGS. 4A, 4B and 4C the top and bottom panels 40a, 40b, 39a and 39b may differ in size from each other and may be configured to set inside of the side panels 35-38. Side panel 35a represents a full height panel when the bottom panel 39a and top panel 40a fit inside. Side panel 35b represents an increased height panel over that of panel 35 when one or the other of the top and bottom panels are positioned inside the side panel.

Figure 5:
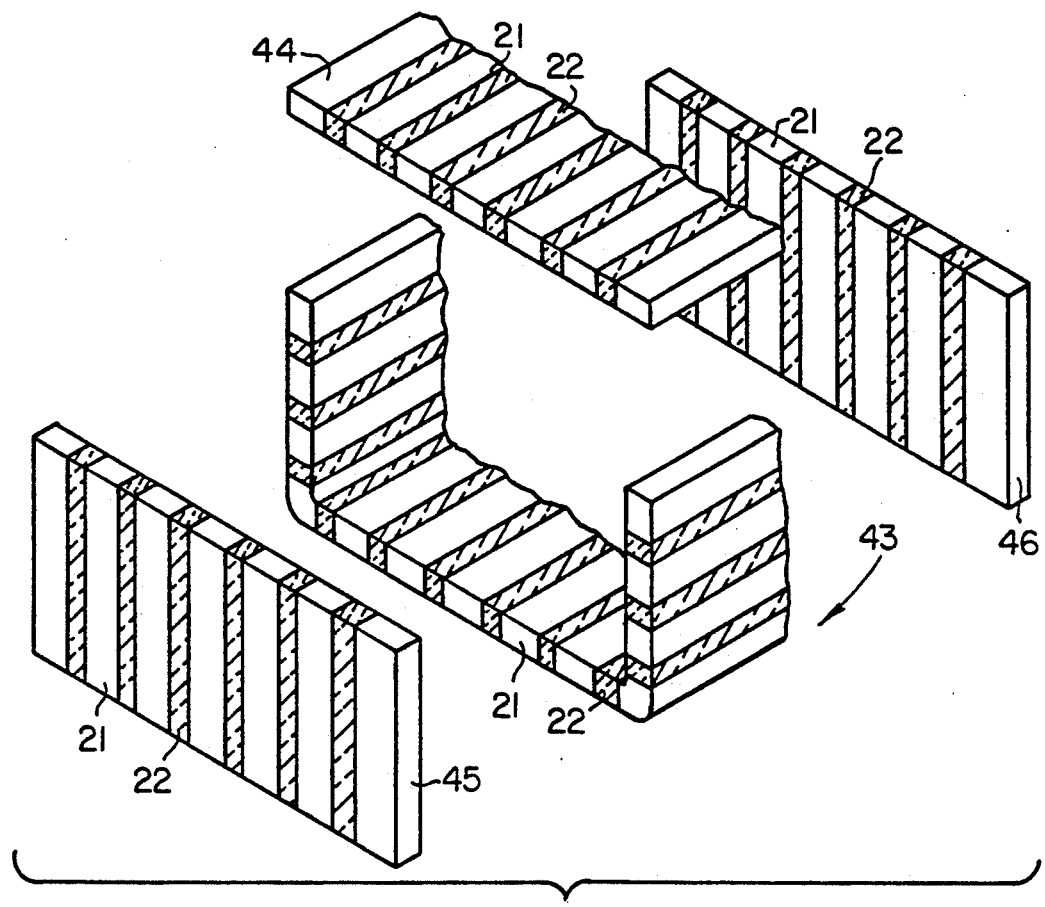
FIG. 5 is an exploded, partial perspective view of a protective packaging wrap concept according to a typical embodiment of the present invention.
Figure 6:
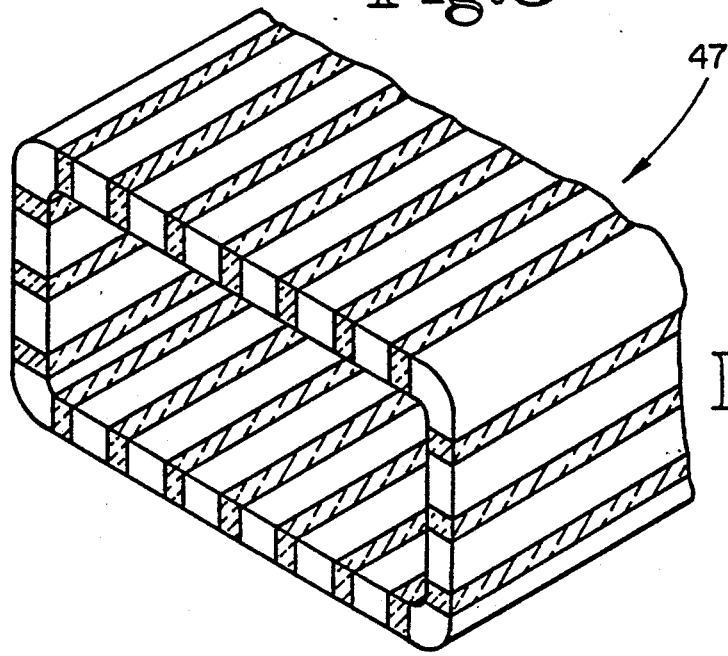
FIG. 6 is a partial perspective view of a protective packaging wrap according to a typical embodiment of the present invention.

Referring to FIG. 5 another protective packaging embodiment is illustrated. Sheet 43 is configured as an under and side wrap which provides protection for three surfaces of the product. To completely enclose the product a top and two end panels of protective packaging are needed. These are illustrated as panels 44, 45 and 46 as an exploded view. If the length of sheet 43 is increased, an encircling sheet 47 (see FIG. 6) is created, thus eliminating the need for a top panel. In each panel or sheet there is an alternating series of flexible material strips 21 and rigid material strips 22 with the same design and material selection options outlined for sheets 20, 25 and 26.

As to each of the protective packaging structures and concepts of FIGS. 1-6, the rigidity characteristics can be managed and designed by the choice of material, the thickness of the flexible and rigid strips and the spacing or ratio of the rigid material strip thickness to the flexible material strip thickness. The direction of strip orientation with respect to the product and surrounding carton can also be changed to increase or decrease sheet and panel stiffness in a given direction.

Figure 7:
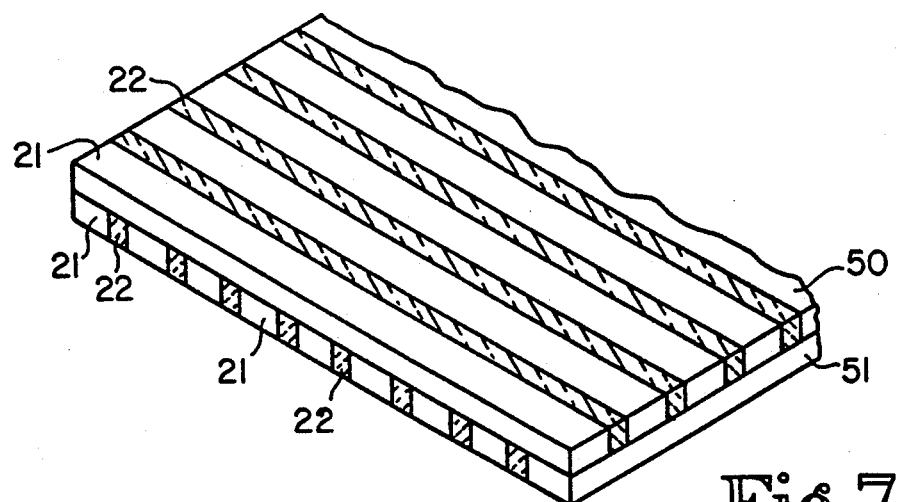
FIG. 7 is a partial perspective view of a packaging wrap including two identical sheets turned at 90 degrees to each other according to the present invention.

By laminating two sheets together and turning one 90 degrees to the other, rigidity is provided in both directions. This particular arrangement is illustrated in FIG. 7 where sheet 50 is virtually identical to sheet 20, except for size and thickness and sheet 51 is virtually identical to sheet 50, except as to its orientation. In fact, sheets 50 and 51 can be cut from the same larger sheet made up of alternating flexible material strips 21 and rigid material strips 22.

While a wide variety of material choices have been discussed for the flexible and rigid strips, 21 and 22, respectively, a further variation is contemplated by the present invention. When the material selection for enhanced thermal insulating properties was discussed, the focus was on maintaining a desired temperature for the goods during shipment and storage. Whether to keep the items from getting too cold or too hot, the concept was to use materials which would not only provide packaging protection against adverse shipping and handling forces but would also provide thermal insulation. The present invention further contemplates using the protective packaging wrap, such as sheet 20, with the shipped product after it reaches its final destination and is put into use or service. When the product is an appliance there may be a desire to consider acoustical insulation materials as well as thermal insulation materials.

Figure 8:
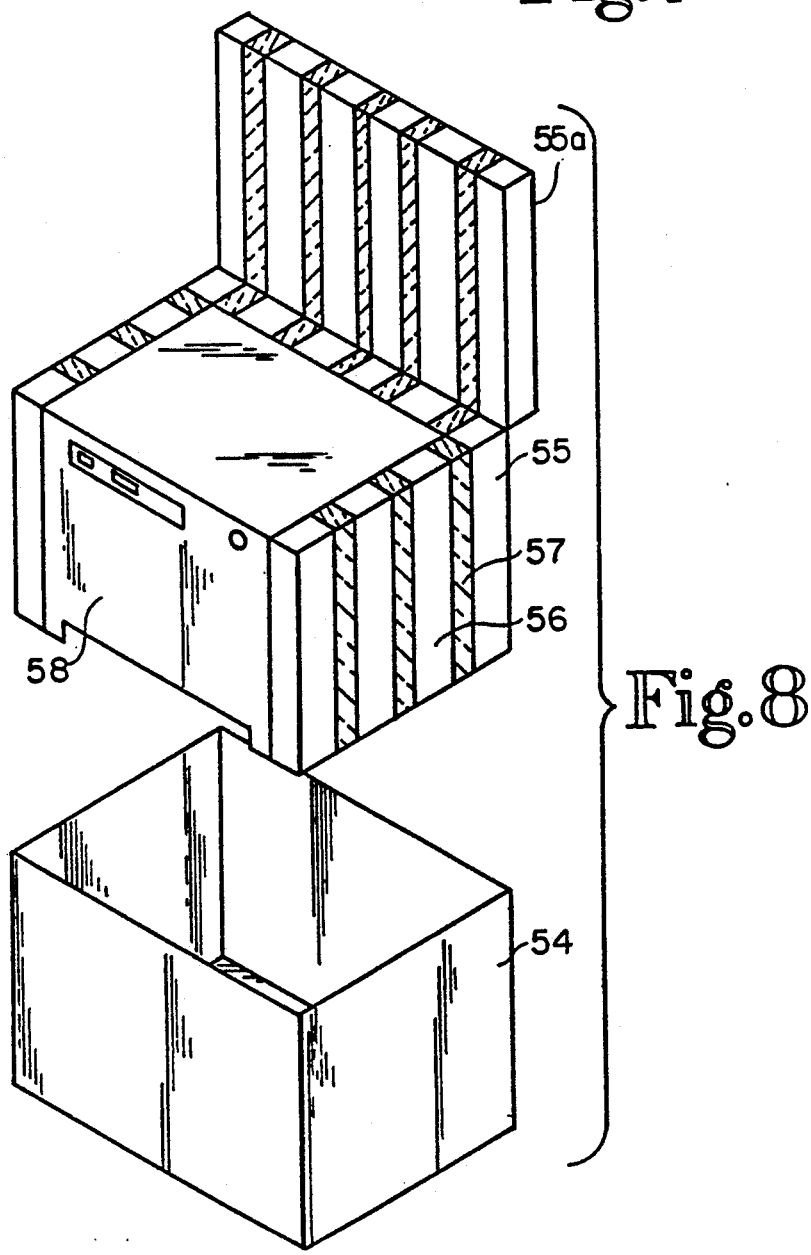
FIG. 8 is a perspective view of a protective packaging wrap according to the present invention as disposed about an appliance.

The concept of having the protective packaging material serve a dual purpose would apply to products such as under the counter dishwashers, for example. These dishwashers need to be acoustically insulated when installed yet they still need to have protection while being shipped. And this packaging protection needs to focus on both strength and rigidity due to the size and weight of the product. Typically dishwashers are shipped in corrugated cartons with corrugated corner posts. This packaging approach can be replaced by the present invention as is illustrated in FIG. 8. While a corrugated carton 54 is still used, the protective packaging further includes wrap 55 consisting of a sheet of alternating strips 56 of fiberglass with strips 57 of corrugated board or chipboard. This wrap extends over three sides at a minimum, and can be configured into a generally block-T shape as disclosed in U.S. Pat. No. 4,985,106 issued Jan. 15, 1991 to Nelson which patent is hereby expressly incorporated by reference. The underside of dishwasher 58 is structurally reinforced but can include some insulation material as is illustrated and described in U.S. Pat. No. 4,985,106. Top layer 55a represents the portion of the wrap for the top surface of the dishwasher. When the top layer is provided the block-T shape is created.

Figure 9:
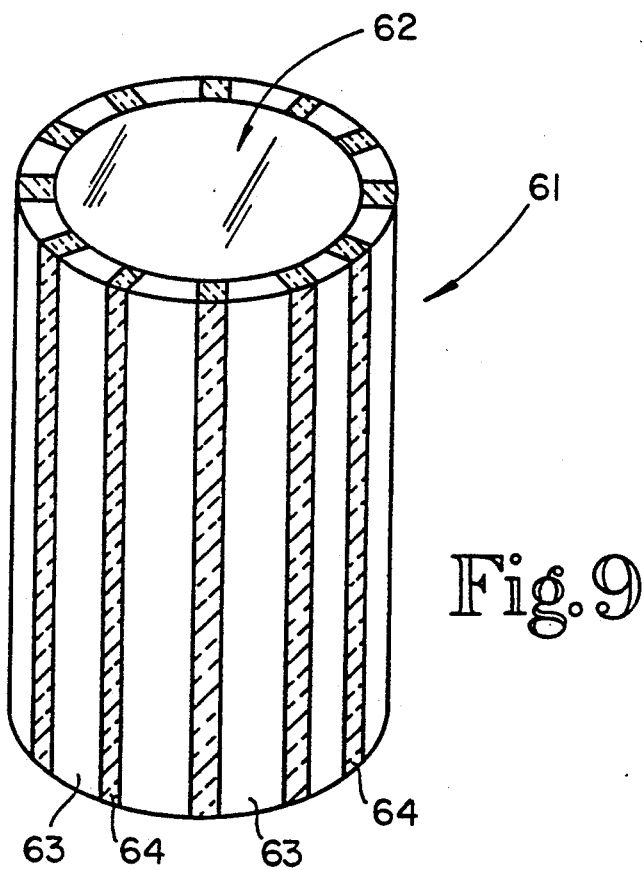
FIG. 9 is a perspective view of a protective packaging wrap as disposed about a cylindrical object according to the present invention.

Another dual use for the alternating strip wrap of the present invention is in connection with a hot water heater. A wrap 61 may be placed around the water heater 62 as illustrated in FIG. 9. Top and bottom caps are used to complete the protective packaging and the overall combination can be placed inside a corrugated carton or other structural outer container. However, if enough structural rigidity and stiffness is provided by only wrap 61 then the carton can be omitted. This approach saves time and money and allows for greater packaging density on the truck or vehicle which is used for shipment.

When the water heater is placed in service wrap 61 remains on the water heater in order to provide additional thermal insulation. The flexible material strips 63 provide flexibility and thermal insulation while the rigid strips 64 provide strength and rigidity as well as thermal insulation.

If the protective packaging wrap of the present invention is configured with sufficient strength and rigidity based on the selected rigid material for strips 22 as well as their size and size ratio to the flexible material strips 21, the wrap itself can constitute the shipping container. While an outer skin of plastic or corrugated board may be desirable for the aesthetics and to provide suitable surfaces for marking and shipping labels, conventional rectangular and circular shapes are not essential in that this protective packaging wrap has greater shape versatility. The actual container can take on virtually any shape as the protective wrap is closely conformed to the peripheral contour shape of the product being shipped.

In each wrap, sheet or panel embodiment described herein, it is to be understood that an outer lamination layer may be applied to either or both surfaces of the wrap, sheet or panel. This outer lamination layer can be a plastic film, corrugated board, chipboard or metal. The use of a thin plastic film enables a more decorative outer appearance for the wrap and can also improve the degree of thermal insulation.

Another aspect and advantage of the present invention is that "less" of an enclosing corrugated container is needed. Due to the added strength and support rigidity provided by the relatively rigid material strips, a thinner corrugated wall can be used resulting in a lower cost enclosing container.

Another packaging concept which is able to be addressed by the present invention involves shapes which are compound as to their contour and curvature. Compound curvatures require flexing or compressibility in at least two planes or directions. If a rigid strip can lay in one direction without interference, how can it at the same time bend 90° or curve into another surface? The answer to the foregoing question is provided by the unique panels illustrated in FIGS. 10-14.

Figure 10:
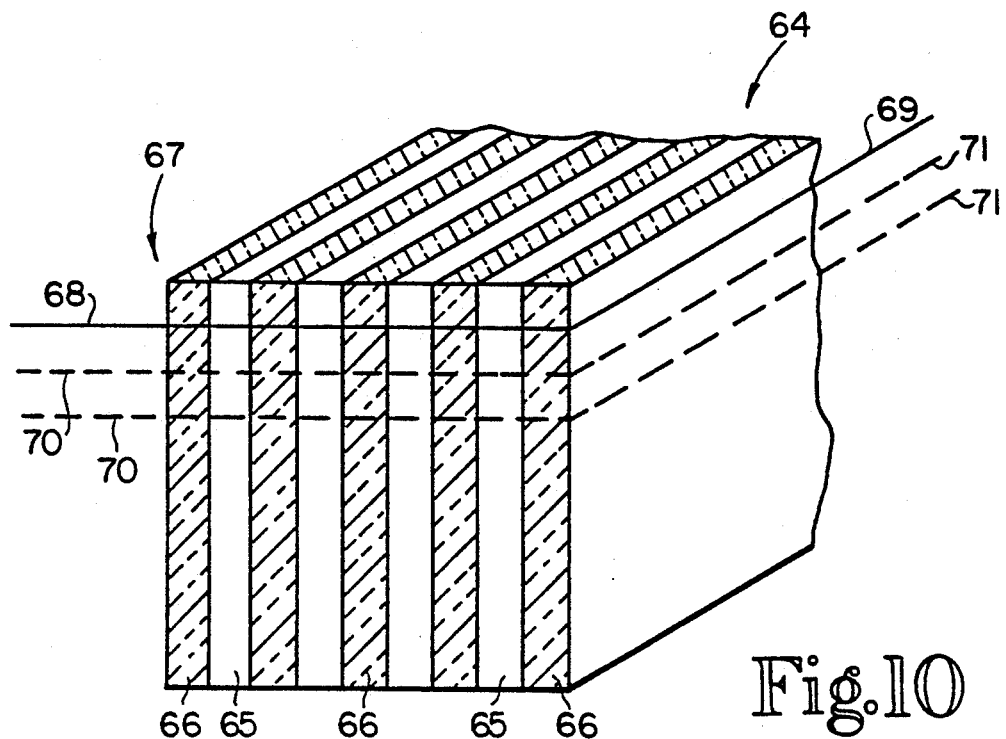
FIG. 10 is a partial perspective view of a starting block of material which may be cut to produce a protective packaging wrap according to the present invention.

Referring to FIG. 10, there is illustrated block 64 which includes an alternating series of insulation material panels 65 and rigid material panels 66. Adjacent panels of this alternating series of panels are bonded together by means of a suitable adhesive disposed between the panels. Once block 64 is formed, the next step in the assembly of a totally flexible blanket of rigid and flexible material is to cut a top layer from block 64. Top layer 67 is separated from block 64 by a complete horizontal cut along the geometric plane containing cutting lines 68 and 69. Due to the adhesive bonding together of adjacent panels, the alternating strips of rigid and flexible material of top layer 67 remain together, intact.

The next step in the process is to continue making horizontal cuts of uniform thickness as represented by broken lines 70 and 71 through the remainder of block 64 such that the then-next top layer of the reduced size block is separated. The result is a series of panels (top layers 67) which are all similarly sized and shaped.

Figure 11:
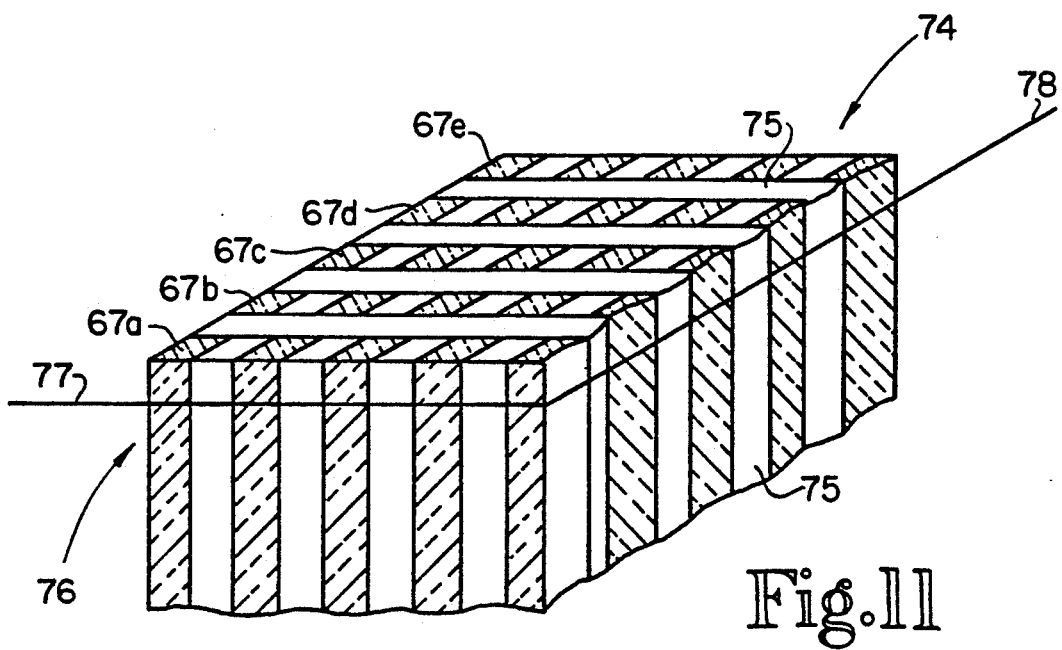
FIG. 11 is a partial perspective view of an alternate block of material for fabrication of an alternative protective packaging wrap according to the present invention.
Figure 12:
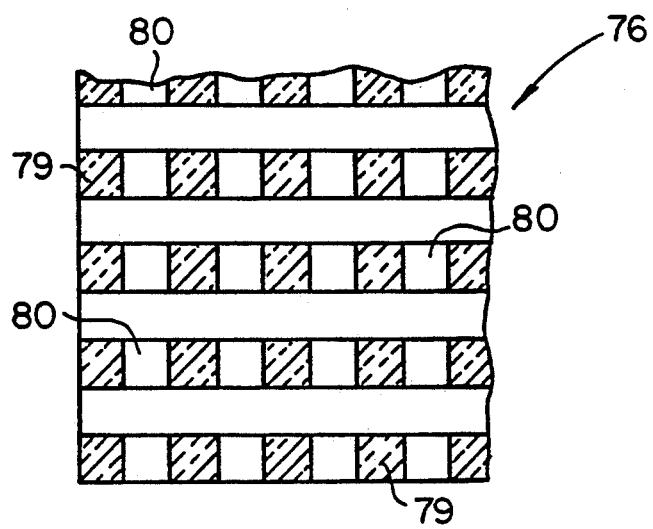
FIG. 12 is a partial top plan view of a protective packaging wrap as cut from the FIG. 11 block of material.
Figure 12A:
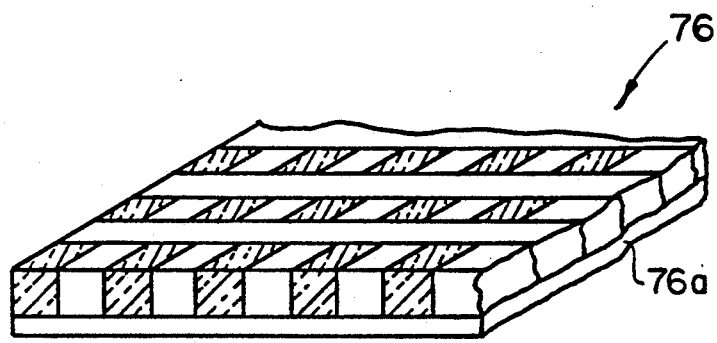
FIG. 12A is a partial perspective view of the FIG. 12 protective packaging wrap as joined to a backing material according to the present invention.
Figure 12B:
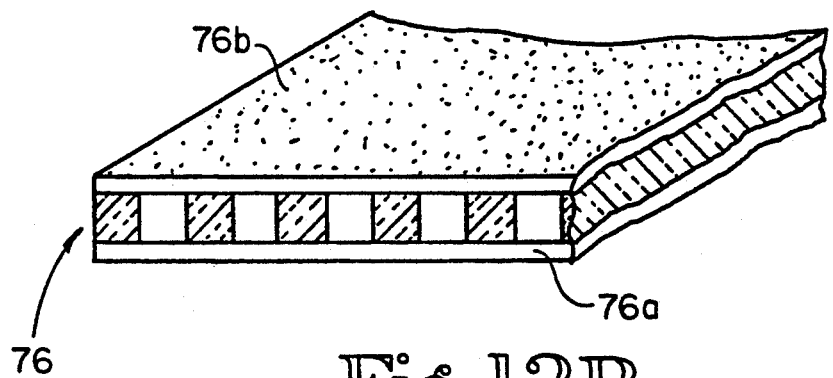
FIG. 12B is a partial perspective view of the FIG. 12A protective packaging wrap and backing with an added layer of soft foam according to the present invention.

The next step in the assembly process for one style of a totally flexible blanket is to stack each of the removed top layers derived from the cutting of the block as illustrated in FIG. 10 into a new block 74 which includes representative top layers 67a-67e turned on end and alternated with panels 75 of flexible material as illustrated in FIG. 11. The number and size of panels 65 and 66 may vary and the thickness of cut determines the number of panels or layers 67 which come from block 64. As with block 64 adjacent layers and panels are bonded together by means of a suitable adhesive. Once block 74 is fabricated, horizontal cuts are taken to remove top layer 76. Saw lines 77 and 78 represent the geometric plane of the first horizontal cut and the broken lines represent the remaining cuts which are taken so as to completely separate block 74 into a plurality of blankets. In this particular arrangement, it is to be noted that the cutting planes do not have to be evenly or uniformly spaced since the top layer 76 which is removed goes directly into an end-use environment. The value of the blanket provided by top layer 76 is its ability to bend or flex with virtually any curvature and in any direction. Compound curves can be easily covered since the flexible material of the blanket completely surrounds each block or cube of rigid material. Regardless of the direction of flex or bending or the degree or extent of flexing for each rigid block 79, there is flexible material block 80 (or strip) immediately adjacent which yields to allow the blanket to conform to any desired shape. A top plan view of one top layer (blanket) 76 is illustrated in FIG. 12. FIG. 12A illustrates top layer 76 as laminated with a skin or backing 76a and FIG. 12B illustrates top layer 76 as laminated with backing 76a and soft foam layer 76b.

The use of rigid material is desirable since it stiffens and adds rigidity to the shell skin and since the thermal insulation properties of many rigid insulation materials are superior to many flexible insulation materials. An earlier problem with rigid insulation material was its inability to be used in any complex curved shape unless precisely molded resulting in a dramatically higher cost to the insulation device.

Figure 13:
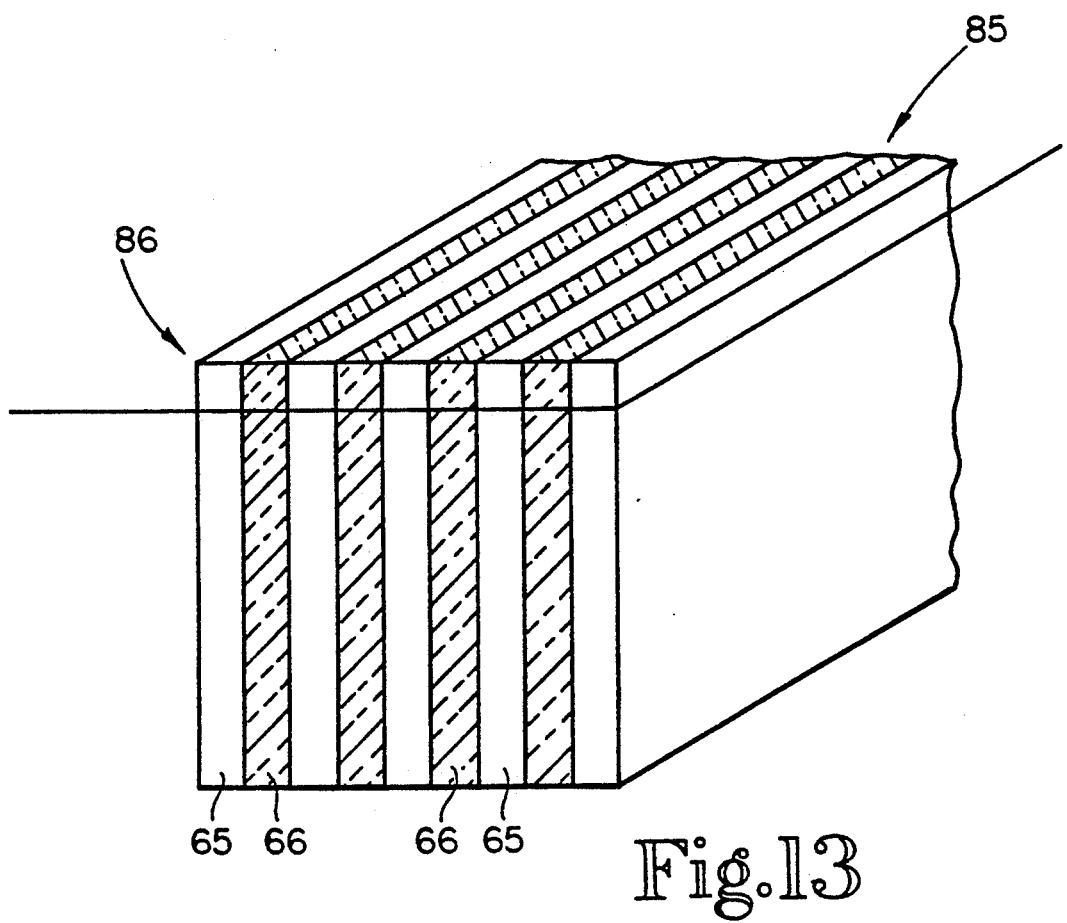
FIG. 13 is a partial perspective view of a material block which is cut to create a protective packaging wrap according to the present invention.
Figure 14:
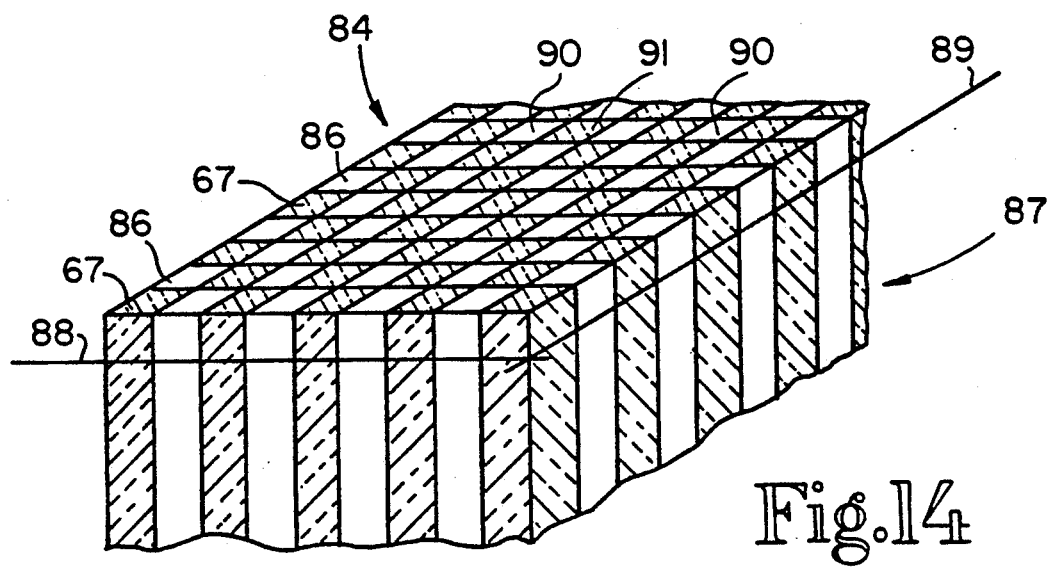
FIG. 14 is a partial perspective view of a material block which is used to create a protective packaging wrap according to the present invention.
Figure 15:
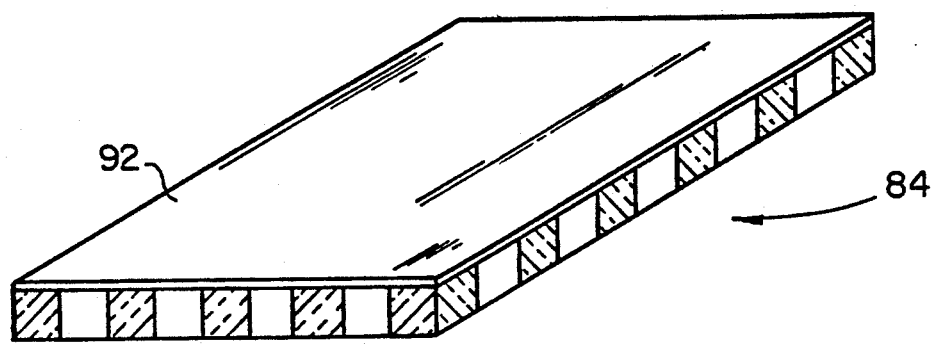
FIG. 15 is a perspective view of a layer of protective packaging wrap as cut from the FIG. 14 block and configured with a backing according to the present invention.

An alternative blanket style consistent with the foregoing fabrication steps and resulting panel design is illustrated in FIGS. 13 and 14. The difference between blanket 84 and top layer 76 lies in the third step of the assembly process. After all the top layers are cut from block 64 and are turned on edge to be used to form block 74, a substitution occurs. For blanket 84 instead of using panels 75 of flexible material between each pair of top layers, top layers are staggered and alternated with each other as to the position of flexible material and rigid material between adjacent panels providing a checkerboard type appearance. The most efficient way to fabricate this alternative blanket style is to begin with block 64 and to fabricate a similar block 85 (see FIG. 13) of equal size except that in block 85 the flexible material panels 65 and the rigid material panels 66 are in reverse sequence from the arrangement of block 64. In block 64, the rigid material panels are on the exterior surfaces while in block 85 it is the flexible material panels which comprise the outer surfaces of the block. As top layers 67 and 86 are removed from their respective block 64 and 85, these layers are alternately laminated into block 87 (see FIG. 14) and bonded together with a suitable adhesive. By taking horizontal cuts in the plane defined by cutting lines 88 and 89, blank 84 is separated from block 87. The manner in which the flexible material blocks 90 are disposed on the four sides of each rigid insulation material block 91 makes blanket 84 able to bend or flex in virtually any direction and with virtually any curvature. Compound curves can be easily covered by blanket 84. To enhance the assembly of either insulating blanket 84 or 74 or to provide for improved handling capabilities an outer layer or facing material 92 (see FIG. 15) can be bonded to the blanket before, after, or during the horizontal cutting process. It is desirable for this material to be able to stretch and flex such as would be possible with a thin polyethylene or PVC film or a thin flexible foam such as urethane. A backing such as 76a, 92, 200 or even 195 that is fabricated out of a stretchable as well as flexible material will enable a little easier conforming to irregular turns, bends and twists. The panel with such a backing will more easily conform over and around irregular or intricate product shapes.

Figure 16:
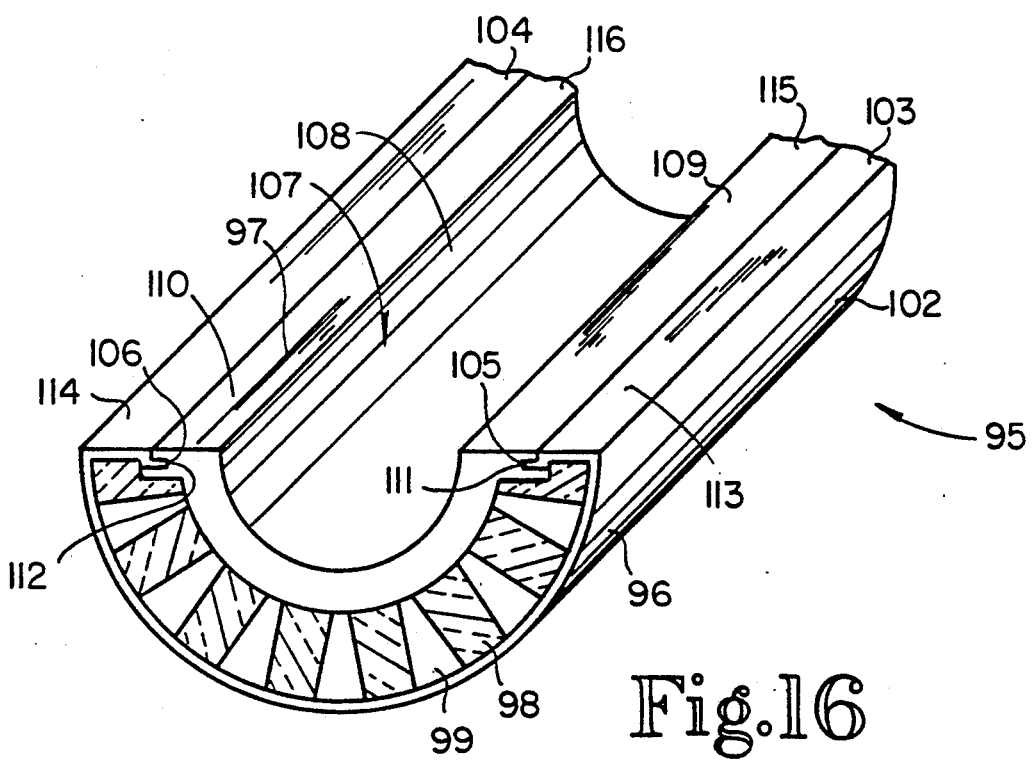
FIG. 16 is a partial perspective view of a generally semi-cylindrical protective packaging wrap according to the present invention.

Referring to FIG. 16, another embodiment of the present invention is illustrated. Although one-half of a complete protective packaging cylinder is shown, it is to be understood that two virtually identical semi-cylindrical sleeves are ultimately joined together to create the complete cylinder which serves as a protective jacket for pipes and generally cylindrical products, components and devices.

Sleeve 95 includes an outer skin or jacket 96, a soft, flexible inner member 97 and alternating strips 98 and 99 of rigid material and flexible material, respectively. Jacket 96 may be molded or extruded from plastic, metal or moldable insulation material such as fiberglass and is configured with an outer, semi-cylindrical body 102, two inwardly directed diametral flanges 103 and 104, each of which has an offset, inwardly extending lip 105 and 106, respectively. The soft flexible inner member has a generally semi-cylindrical center core 107 whose inside surface 108 is designed and arranged to closely conform to the size and shape of the product, component or device to be protected. Outwardly extending, oppositely disposed flanges 109 and 110 each includes a receiving channel 111 and 112, respectively. Channels 111 and 112 are sized and positioned so as to receive therein lips 105 and 106. Receipt of lips 105 and 106 by channels 111 and 112 is achieved by manually shaping the channels so as to spread the sides apart and received the lips 105 and 106. The outer surfaces 113 and 114 of flanges 103 and 104 lie in substantially the same geometric plane as the outer surfaces 115 and 116 of flanges 109 and 110 wherein this geometric plane coincides with the diametral plane of the product to be protected. Once two assembled sleeves 95 are closed together, a generally cylindrical assembly is created with a generally cylindrical center aperture.

An advantage to using this approach is that it allows the use of different materials with different properties to be employed together in one assembly to achieve desired thermal, mechanical and moisture barrier properties as needed for specific products and shipping conditions.

Figure 17:
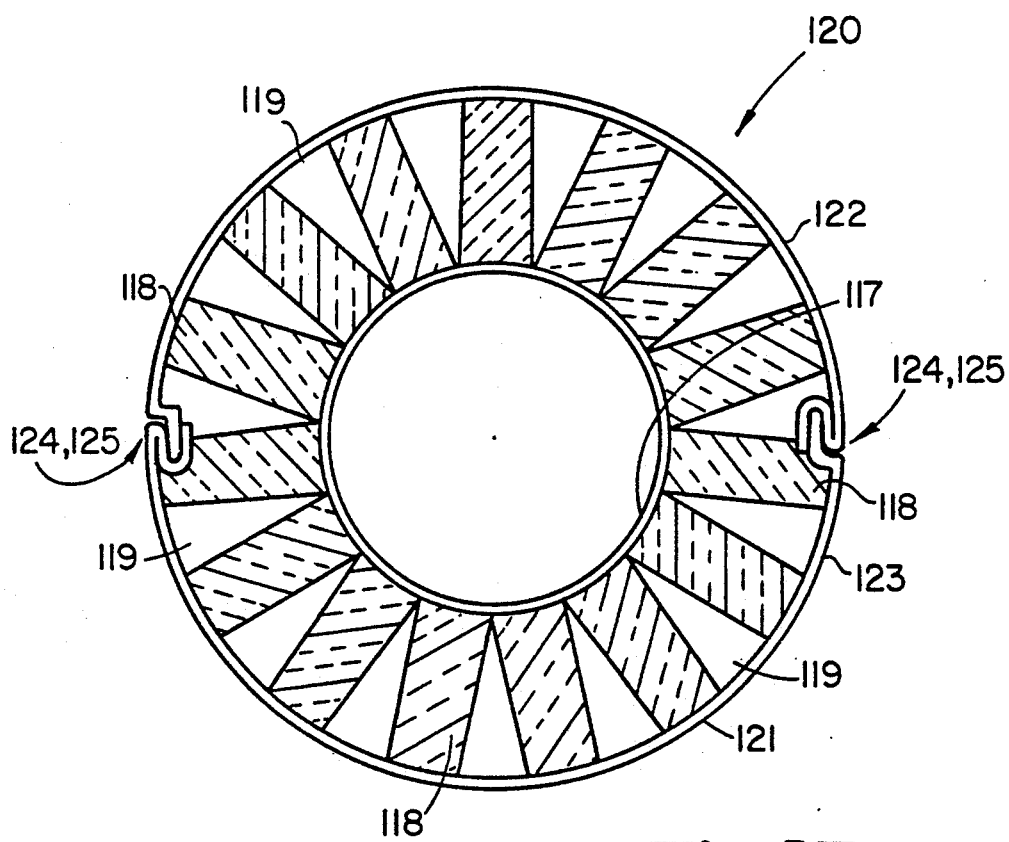
FIG. 17 is an end elevational view of a generally cylindrical protective packaging wrap according to the present invention.

As illustrated in FIG. 17, the outer skin or jacket can be designed for more rigidity and greater strength and a more intricate mechanical clasp or closure can be provided. The inside sleeve 117 is a soft, cushioning skin attached to the inside edges of the rigid material strips 118 and the flexible material strips 119. The size of cylinder 120 and the size of the center cylindrical aperture are determined by the length of the wrap of alternating material strips and the height of the strips or thickness of the wrap. The outer jacket 121 includes two half sleeves 122 and 123 which are cooperatively shaped with opposite tongue and groove edges 124 and 125 respectively, for mutual interfit into the cylindrical shape illustrated.

Figure 18:
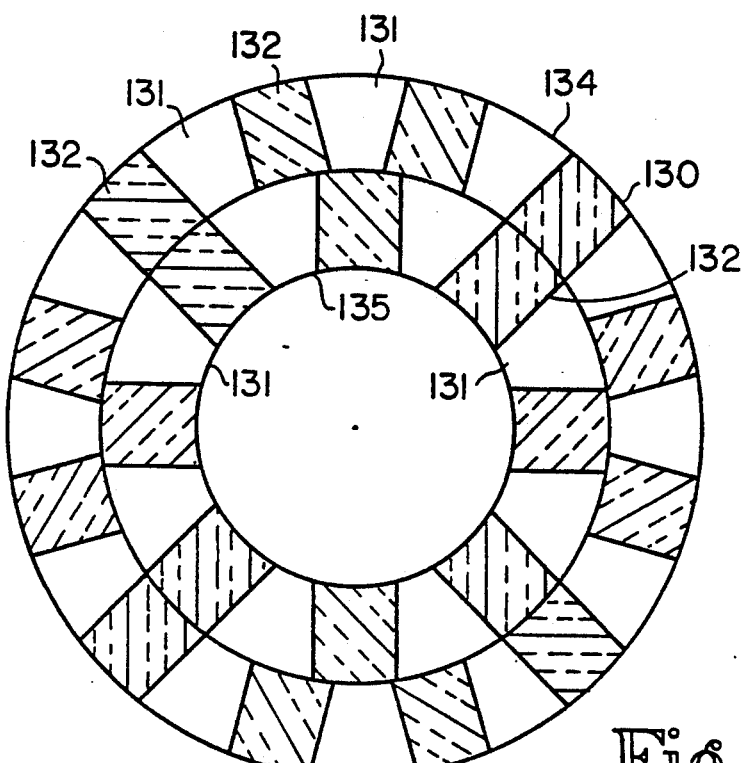
FIG. 18 is an end elevational view of a generally cylindrical protective packaging wrap according to the present invention.
Figure 19:
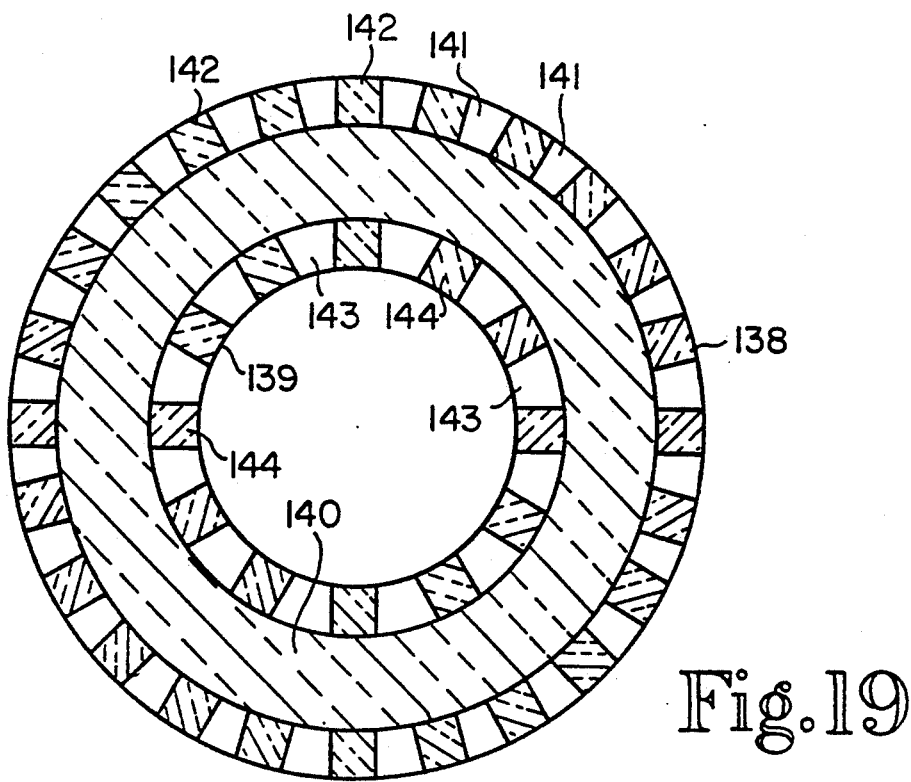
FIG. 19 is an end elevational view of a generally cylindrical protective packaging wrap according to the present invention.
Figure 20:
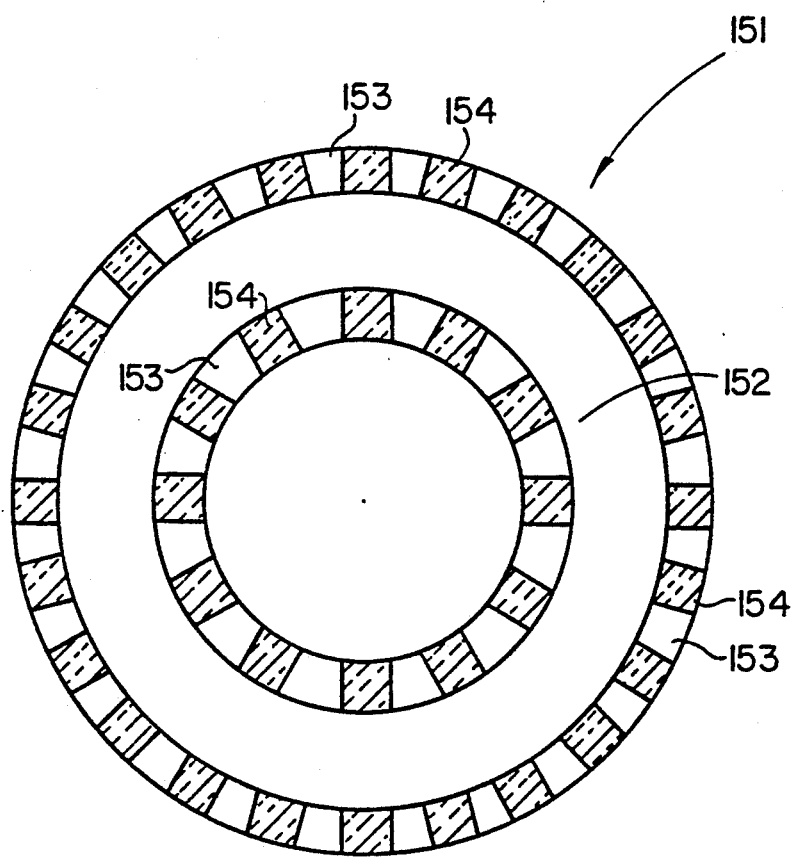
FIG. 20 is an end elevational view of a generally cylindrical protective packaging wrap according to the present invention.

As illustrated in FIGS. 18, 19 and 20, different protective concepts are possible using the alternating flexible and rigid strips concept of the present invention. In FIG. 18, the outer cylindrical sleeve 130 is configured with alternating material strips including flexible cylindrical material strips 131 and rigid material strips 132. The inner sleeve 133 is also configured with alternating strips of material including flexible material strips 131 and rigid material strips 132. However, the radial thicknesses of the strips of the outer sleeve may be different (larger or smaller) than the radial thickness of the strips of the inner sleeve. In the arrangement of FIG. 18, there is no hollow cavity between the outer sleeve and the inner sleeve. By selecting insulation strips of the appropriate radial thickness, the size of the outside cylindrical surface 134 and the size of the inside cylindrical aperture 135 can be controlled. In order to accommodate certain diameter and wall thickness combinations, it may be necessary to configure the rigid and flexible material strips 131 and 132 of the inner core with a certain radial thickness and those of the outer layer with a different radial thickness. For instance, when covering a small cylindrical product device or component, rigid material strips of a small radial thickness would be desirable to give a good fit between the product and the protective material.

If a particular wall thickness of protective material is desired that is thick relative to the product diameter, for instance a 3 to 1 ratio, this allows a sufficient amount of rigid material to make not only a rigid protective package but still provide a good fit to the product.

One modification to the configuration of FIG. 18 is to alternate or stagger the flexible and rigid material strips of the outer sleeve with those of the inner sleeve in order to more completely cover the entire circumference of the product, device or component with rigid material. With this type of staggered alternating configuration of rigid and flexible material strips of the two sleeves, there is rigid material completely around the product thereby providing more uniform strength and rigidity.

In the FIG. 19 illustration, the outer sleeve 138 is made up of alternating strips of flexible and rigid materials and the inner sleeve 139 is also made up of alternating strips of flexible and rigid materials. The outer sleeve and the inner sleeve are spaced apart so as to define a cavity therebetween which is filled with a third protective material 140. The alternating strips of material of sleeve 138 include flexible material strips 141 and rigid material strips 142. The alternating strips of material of core 139 include flexible material strips 143 and rigid material strips 144.

In FIG. 20, the protective packaging structure 151 is structured similarly to the FIG. 19 dual sleeve configuration with the exception that the inner cavity 152 remains as an air space and is not filled with a third protective material. The flexible material strips are identified by reference numeral 153 and the rigid material strips by reference numeral 154.

Figure 21:
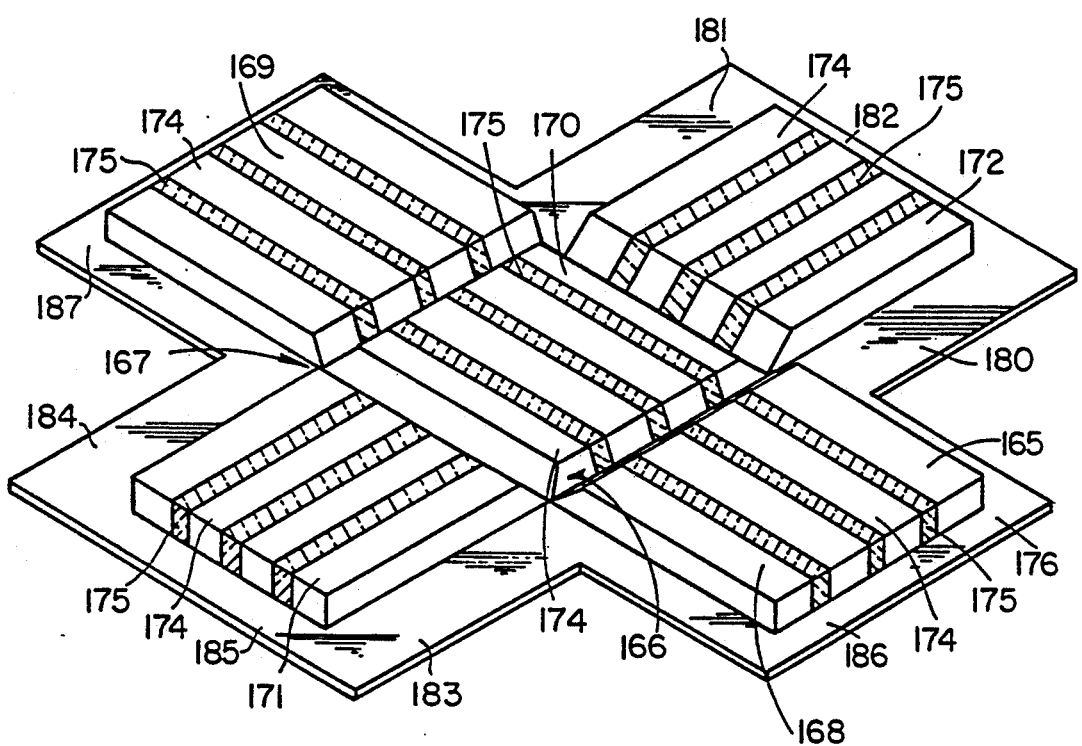
FIG. 21 is a perspective view of a protective carton including protective packaging panels according to the present invention.
Figure 23:
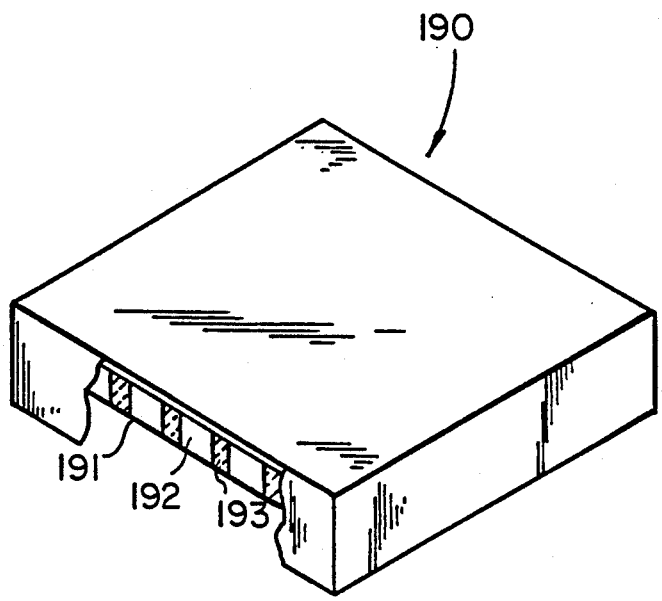
FIG. 23 is a perspective view of a carton top suitable for use with the FIG. 22 carton.
Figure 22:
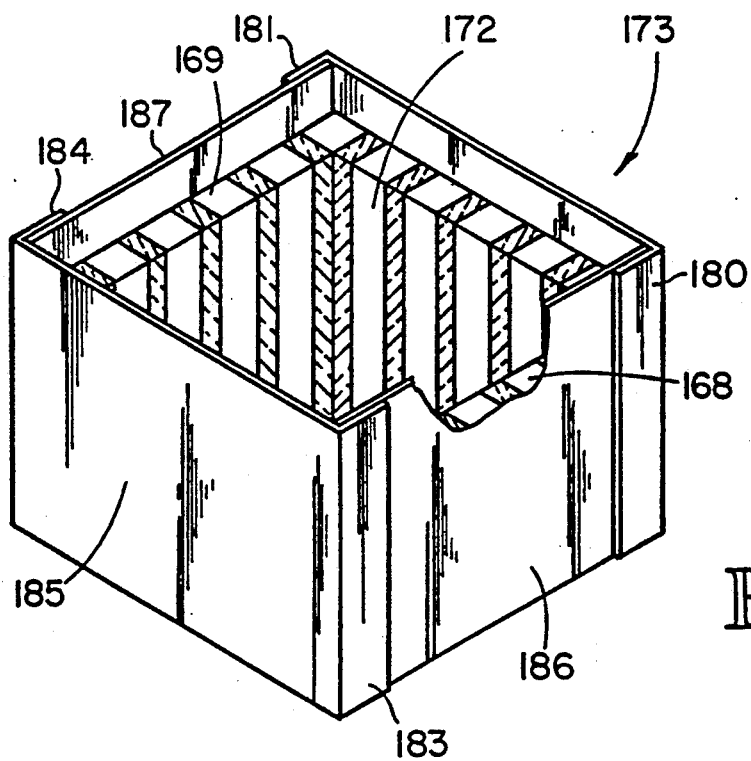
FIG. 22 is a perspective view of the FIG. 21 carton as assembled.

Referring to FIGS. 21, 22 and 23 there is illustrated a further protective packaging concept according to the present invention. Center sheet 165 is prepared as a single panel which is angle cut at joints 166 and 167 with a pair of facing 45 degrees edges enabling these side panels 168 and 169 to be folded into a right angle corner relative to center panel 170. Outer sheets 171 and 172 complete the first five sides of container 173 (see FIG. 22). Sheets 165, 171 and 172 are each arranged with an alternating series of flexible materials strips 174 and rigid material strips 175 joined together by adhesive. These three sheets are bonded onto a backing 176 which in the preferred embodiment is corrugated paper or corrugated paper board. A suitable material selection for the flexible material strips 174 is flexible foam and for the rigid material strips 175 it is chip board.

In FIG. 22 it can be seen that the corrugated paper backing 176 has been cut so as to provide corner edge flaps 180 and 181 on section 182 and corner edge flaps 183 and 184 on section 185. These corner edge flaps which extend laterally beyond the edges of the corresponding sheets 171 and 172 are folded over and glued to sections 186 and 187 in order to create container 173. A top or lid 190 is provided based on the design illustrated in FIG. 23. The corrugated paper outer surface is lined with panel 191 of alternating flexible and rigid materials strips 192 and 193, respectively. The lid is sized so as to fit down over and completely cover the top opening of container 173.

Figure 24:
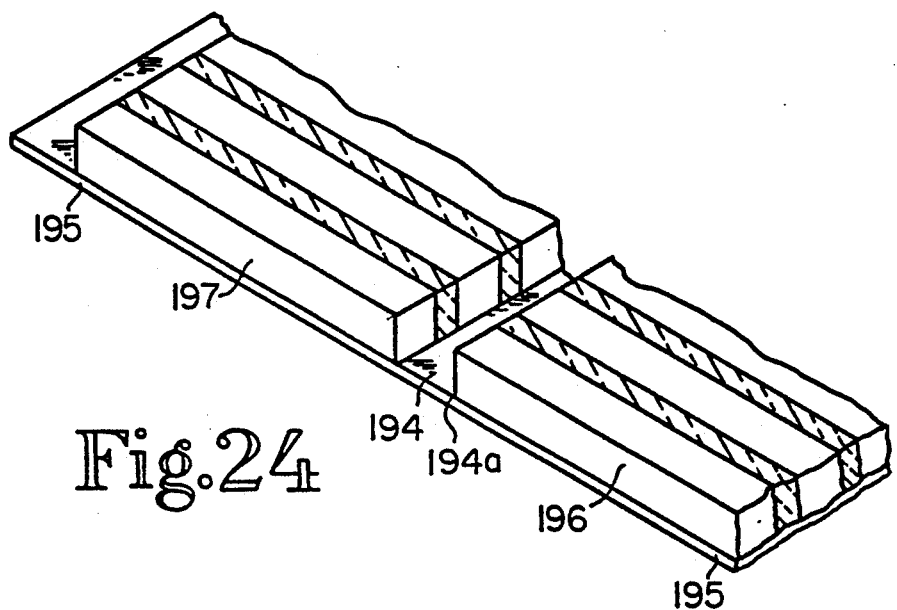
FIG. 24 is a partial perspective view of a protective packaging carton including protective packaging layers according to a typical embodiment of the present invention.
Figure 25:
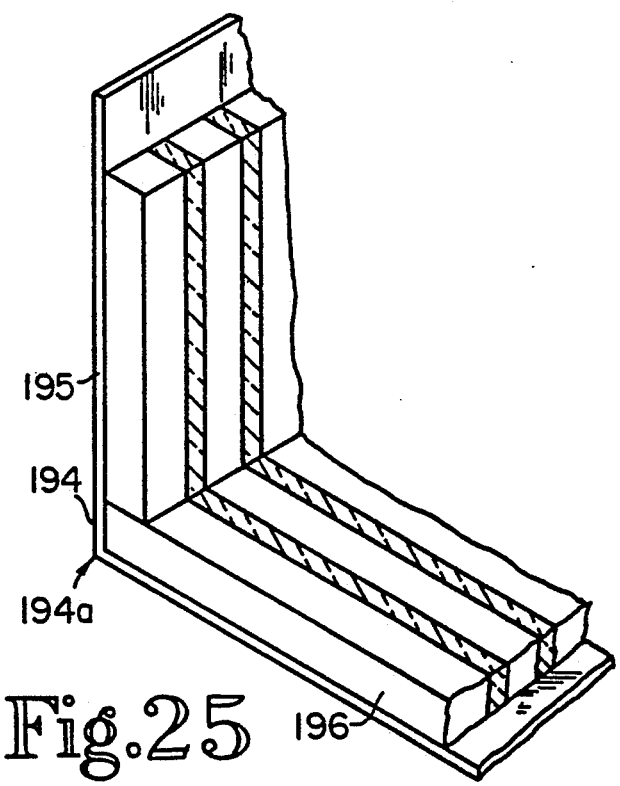
FIG. 25 is a partial side elevational view of the FIG. 24 carton as folded into an assembled orientation according to the present invention.

Referring to FIGS. 24 and 25 another embodiment of the present invention is illustrated where the V-groove of FIG. 21 is replaced by a strip 194 of the skin or backing 195 separating the floor cushion panel 196 from side cushion panel 197. This configuration is typical on each of the four sides of the floor cushion panel 196. The width of strip 194 is equal to the thickness of panel 196 and edge 194a is the typical hinge line location around floor cushion panel 196 for each side cushion panel 197. By this configuration side cushion panel 197 will fold up and over the floor cushion panel 196 as illustrated in FIG. 25.

Although not specifically illustrated, it is to be understood that once a sheet of alternating strips of flexible and rigid material is created by bonding the strips together, it can be shaped and contoured by flexing from either side. However, if the individual material strips are not individually bonded to each other, sheets may still be created by joining the strips to a skin or backing, such as plastic film or corrugated paper. If this sheet is then coiled inwardly so as to compress the top surface (the surface opposite to the skin or backing) flexible material strips must be used due to the size differences between the outside diameter and the inside diameter which are formed based upon the same originating sheet length for those two diameters.

Figure 26:
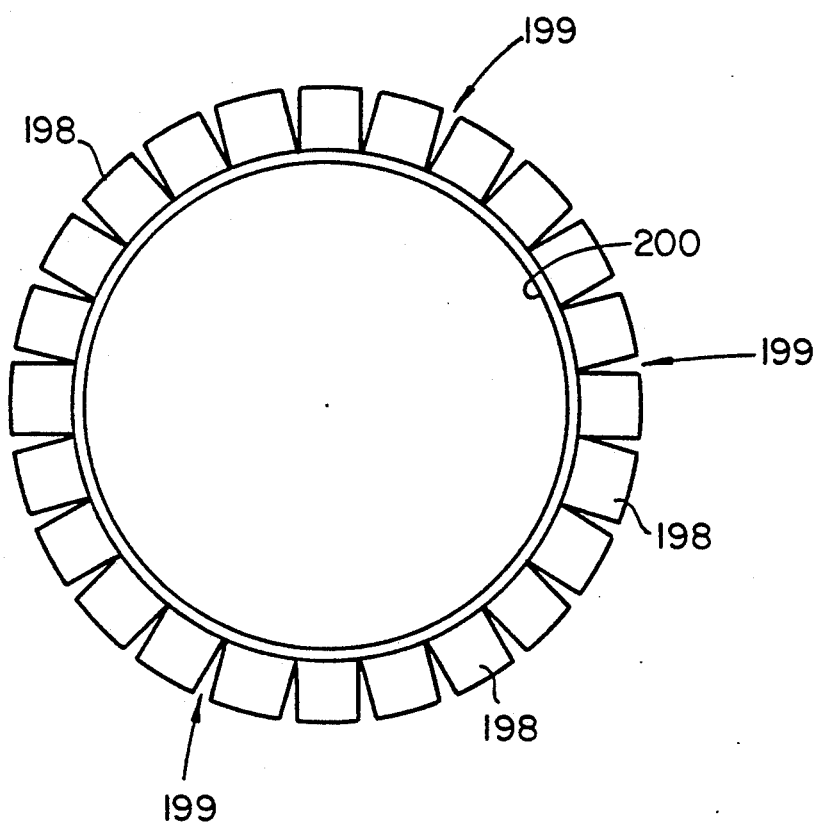
FIG. 26 is a top plan view of a protective packaging wrap as configured for generally cylindrical objects according to the present invention.

If the alternating strips are not bonded together and the skin or backing side is used for the protecting packaging inside diameter, as illustrated in FIG. 26, the strips 198 flare apart allowing air spaces 199 to provide the needed increased length for the outside diameter. In this embodiment because the skin 200 is the inside diameter of the protective packaging and the material strips are not compressed, rigid material can be used for all of the strips 199. While an outer covering may be desirable for aesthetics and to protect the strips from rough or careless handling, it is clear that the sheet is reusable and able to be used on rectangular as well as more intricate product contours.

When a corrugated paper or paper board backing is desired, removal of the outer lamination of paper will expose the corrugated (wavy) inner layer. When this is done the backing can be easily coiled or rolled around its longitudinal axis into a cylindrical form without a need to score the outer paper laminate. The axis of the cylinder will be substantially parallel with the length axis of the corrugations. Such a backing can be used with the structures illustrated in FIG. 9, 16 and 26, for example.

Figure 27:
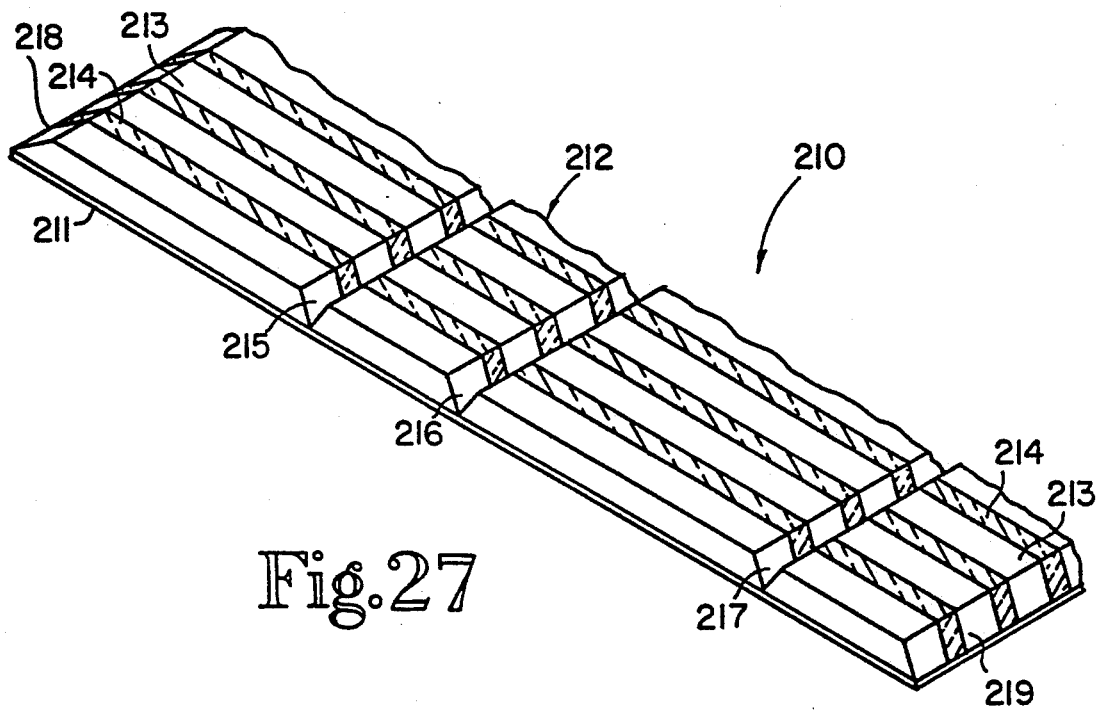
FIG. 27 is a perspective view of a protective packaging container including protective packaging layers according to a typical embodiment of the present invention.
Figure 28:
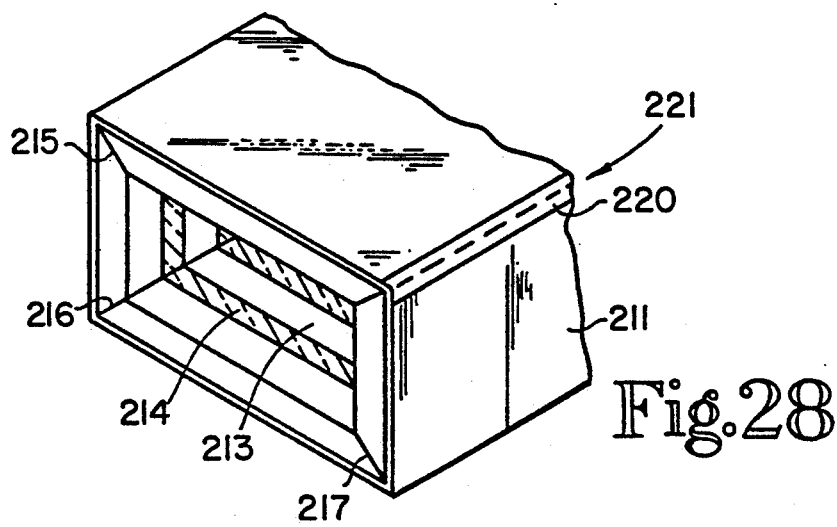
FIG. 28 is a perspective view of the FIG. 27 protective packaging container as folded into an assembled condition.
Figure 29:
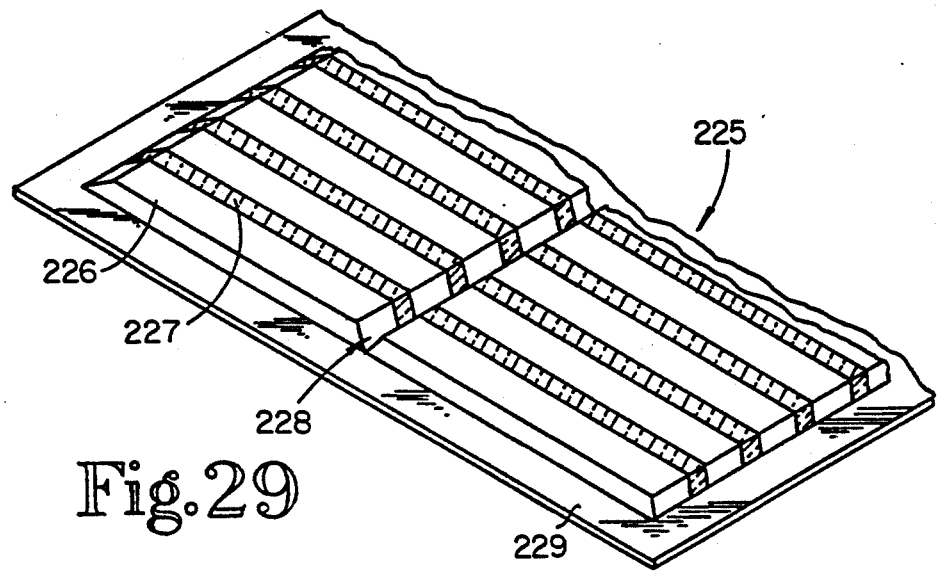
FIG. 29 is a perspective view of a protective packaging envelope including protective packaging layers according to a typical embodiment of the present invention.

As a further variation to the packaging structure FIGS. 21, 22 and 23, a four sided enclosing sheet 210 is illustrated in FIG. 27. Sheet 210 includes a corrugated backing 211 and a panel 212 of protective material of alternately arranged flexible material strip 213 and rigid material strips 214. Panel 212 is cut with V-grooves 215, 216, and 217 with facing edges cut at 45 degrees. Outer edges 218 and 219 are also cut at 45 degrees. Directly beneath each V-groove the corrugated backing is crushed or scored in order to provide a clean and sharp fold edge. Upon folding this configuration into the carton arrangement of FIG. 28, the V-grooves close together thereby creating a right angled corner. Likewise, outer edges 218 and 219 abut together to create the fourth corner. A strip of tape 220 is used to secure the backing at edges 218 and 219 together so that the container 221 holds and maintains its folded rectangular form. By using a thinner panel 225 of alternating flexible strips 226 and rigid strips 227 and only one groove 228, as illustrated in FIG. 29, a protective envelope is created. This panel simply is folded over at groove 228 and secured at the edges of backing 229 to create the envelope. The resultant combined flexibility and rigidity enables small, somewhat delicate articles to be shipped by mail with minimal risk of damage.

Figures 30, 31:
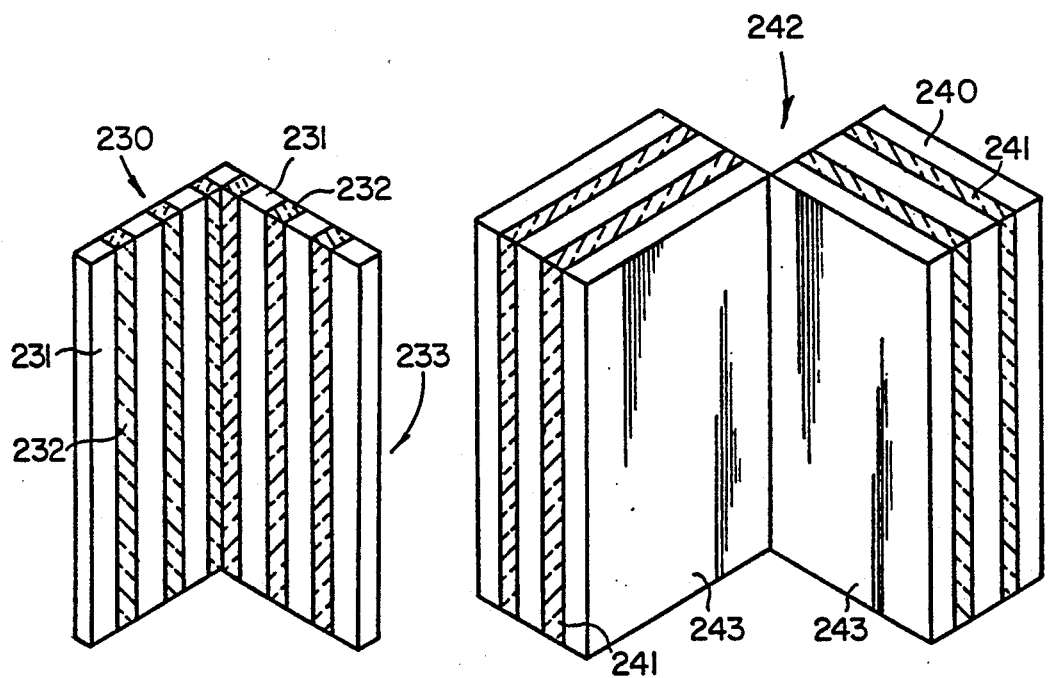
FIG. 30 is a perspective view of a protective packaging corner post according to a typical embodiment of the present invention.
FIG. 31 is a perspective view of a protective packaging corner post according to a typical embodiment of the present invention.

A still further protective packaging concept envisioned as part of the present invention is to use a sheet 230 of alternating flexible and rigid material strips 231 and 232, respectively, which is folded to create a corner post 233, as illustrated in FIG. 30. By changing the orientation of the alternating flexible strips 240 and rigid strips 241 a different corner post 242 is able to be created, as illustrated in FIG. 31. While both corner posts provide rigid stacking strength when used in combination with conventional corrugated paper container, corner post 242 provides greater cushioning since its outer flexible material strip 243 faces inwardly in the direction of the product which is to be placed in the corrugated container.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A protective wrap for use in packaging and shipping comprises:
   a plurality of first composite material strips including in alternating sequence flexible material sections and relatively rigid material sections;
   a plurality of second composite material strips including in alternating sequence flexible material sections and relatively rigid material sections; and
   said first composite material strips and said second composite material strips being arranged side by side in alternating sequence and shifted longitudinally by one section such that flexible material sections of one composite material strip are longitudinally aligned with relatively rigidly material sections of the other composite material strips said plurality of material strips being joined in position in order to create said protective wrap in a checker board-type pattern.

2. The protective wrap of claim 1 which further includes a backing layer wherein the two pluralities of composite material strips are adhesively joined to said backing layer.

3. The protective wrap of claim 1 which further includes a soft foam layer overlaying said alternating series of first composite material strips and said second composite material strips.

4. The protective wrap of claim 1 wherein said flexible material sections are fabricated out of fiberglass batting and said relatively rigid material sections are fabricated out of corrugated paper.

5. A protective wrap for use in packaging and shipping comprises:

a first panel including a plurality of flexible material strips and a plurality of relatively rigid material strips wherein said flexible material strips and said relatively rigid material strips are arranged side by side in alternating sequence and joined in position to create a said first panel of protective material; and a second panel of protective material including a plurality of flexible material strips and a plurality of relatively rigid material strips wherein said flexible material strips and said relatively rigid material strips are arranged side by side in alternating sequence and joined in position to create said second panel of protective material wherein said first panel and said second panel are turned 90 degrees to each other relative to the longitudinal direction of said material strips and joined together so as to create said protective wrap of a double panel thickness.

6. The protective wrap of claim 5 wherein said flexible material strips and said relatively rigid material strips of said first panel are adhesively joined together and wherein said flexible material strips and said relatively rigid material strips of said second panel are adhesively joined together.

7. The protective wrap of claim 6 wherein said flexible material strips of said first and second panels are fabricated out of flexible urethane foam and said relatively rigid material strips of said first and second panels are fabricated out of expanded polystyrene foam.

8. The protective wrap of claim 5 which further includes a soft foam layer overlying said second panel.

9. The protective wrap of claim 8 wherein said flexible material strips of said first and second panels are fabricated out of flexible urethane foam and said relatively rigid material strips of said first and second panels are fabricated out of corrugated paper.

10. A protective packaging system for use in packaging and shipping comprises:

a first panel including a plurality of flexible material strips and a plurality of relatively rigid material strips arranged side by side in alternating sequence and joined in position to create said first panel; and a second panel including a plurality of flexible material strips and a plurality of relatively rigid material strips arranged side by side in alternating sequence and joined in position in order to create said second panel, said first and second panels having the same length and different widths wherein said second panel is disposed above said first panel and said second panel is shorter in width than said first panel whereby forming said panels into a generally cylindrical shape creates a concentric configuration of a first cylinder formed by said second panel and an outer surrounding cylinder formed by said first panel.

11. The protective packaging system of claim 10 wherein said first and second panels are separated by a layer of material whose length is the same as the length of said first and second panels and whose width is in between the width of first and second panels so as to create a concentric inner cylinder relative to the cylinders created by said first and second panels when formed into a generally cylindrical shape.

12. The protective packaging system of claim 10 wherein said first and second panels are separated from each other with means for fixing the separation such that the concentric cylindrical configuration of said first panel and second panel includes a generally cylindrical void separating said two panels when formed into a generally cylindrical shape.

* * * * *